(12) United States Patent
Palmer

(10) Patent No.: US 12,152,765 B2
(45) Date of Patent: Nov. 26, 2024

(54) JUNCTION BOX AND LIGHTING ASSEMBLY WITH O-RING AND RELATED SYSTEMS AND METHODS

(71) Applicant: Energyficient Lighting Syst., Burlington, IA (US)

(72) Inventor: Chad Palmer, Burlington, IA (US)

(73) Assignee: Energyficient Lighting Syst., Burlington, IA (US)

( * ) Notice: Subject to any disclaimer, the term of this patent is extended or adjusted under 35 U.S.C. 154(b) by 920 days.

(21) Appl. No.: 17/080,377

(22) Filed: Oct. 26, 2020

(65) Prior Publication Data

US 2021/0108792 A1    Apr. 15, 2021

Related U.S. Application Data

(63) Continuation of application No. 15/669,415, filed on Aug. 4, 2017, now abandoned, which is a (Continued)

(51) Int. Cl.
| | |
|---|---|
| *F21V 23/06* | (2006.01) |
| *F21K 9/20* | (2016.01) |
| *F21V 15/01* | (2006.01) |
| *F21V 29/67* | (2015.01) |
| *F21V 31/00* | (2006.01) |
| *H02G 3/08* | (2006.01) |
| *F21V 23/00* | (2015.01) |
| *F21V 29/77* | (2015.01) |
| *F21Y 115/10* | (2016.01) |

(52) U.S. Cl.
CPC ............... *F21V 23/06* (2013.01); *F21K 9/20* (2016.08); *F21V 15/01* (2013.01); *F21V 29/673* (2015.01); *F21V 31/005* (2013.01); *H02G 3/081* (2013.01); *H02G 3/086* (2013.01); *H02G 3/088* (2013.01); *F21V 23/005* (2013.01); *F21V 29/773* (2015.01); *F21Y 2115/10* (2016.08); *H02G 3/08* (2013.01)

(58) Field of Classification Search
CPC ........ F21V 23/06; F21V 29/673; F21V 15/01; F21V 31/005; F21V 29/773
USPC ....................................................... 220/3.2
See application file for complete search history.

(56) References Cited

U.S. PATENT DOCUMENTS

| | | |
|---|---|---|
| 5,541,363 A | 7/1996 | Weise et al. |
| 6,812,398 B2 | 11/2004 | Yueh |

(Continued)

FOREIGN PATENT DOCUMENTS

| | | |
|---|---|---|
| CA | 149940 | 3/2014 |
| CA | 150013 | 3/2014 |

(Continued)

*Primary Examiner* — J. Gregory Pickett
*Assistant Examiner* — Niki M Eloshway
(74) *Attorney, Agent, or Firm* — DENTONS DAVIS BROWN PC; Matthew Warner-Blankenship

(57) ABSTRACT

The disclosed apparatus, systems and methods relate to a modular light, fixture body, junction box and sub assembly. The light has a central housing and can be adapted to fit with existing sockets. Further additional twist and lock components are provided, including a twist and lock luminaire body. The light can be installed without tools, and can be easily replaced, and prevents the accumulation of water within the light.

20 Claims, 30 Drawing Sheets

Related U.S. Application Data continuation-in-part of application No. 15/006,990, filed on Jan. 26, 2016, now Pat. No. 9,803,844.

(60) Provisional application No. 62/371,042, filed on Aug. 4, 2016, provisional application No. 62/204,599, filed on Aug. 13, 2015, provisional application No. 62/155,983, filed on May 1, 2015, provisional application No. 62/107,810, filed on Jan. 26, 2015.

(56) References Cited

U.S. PATENT DOCUMENTS

| | | | |
|---|---|---|---|
| 7,033,038 B2 | 4/2006 | Hagen | |
| 7,523,837 B2 * | 4/2009 | Schoenweger | H02G 3/121 |
| | | | 220/3.7 |
| 7,972,038 B2 * | 7/2011 | Albright | F21S 43/249 |
| | | | 362/249.02 |
| 8,348,476 B2 * | 1/2013 | Fletcher | F21V 29/773 |
| | | | 362/249.02 |
| 8,414,178 B2 | 4/2013 | Alexander et al. | |
| 8,613,529 B2 | 12/2013 | Watanabe | |
| 8,641,243 B1 | 2/2014 | Rashidi | |
| 8,696,158 B2 | 4/2014 | Santiago | |
| D709,835 S | 7/2014 | Jones | |
| D711,834 S | 8/2014 | Jones | |
| D713,355 S | 9/2014 | Jones et al. | |
| 9,062,869 B2 | 6/2015 | Lay et al. | |
| 9,091,417 B2 | 7/2015 | Castillo | |
| 9,146,022 B2 | 9/2015 | Moser | |
| 9,739,457 B2 | 8/2017 | Breen et al. | |
| 9,803,844 B2 | 10/2017 | Palmer | |
| 9,964,266 B2 | 5/2018 | Danesh | |
| 2004/0150998 A1 * | 8/2004 | Fan | H01R 13/5219 |
| | | | 362/267 |
| 2012/0195041 A1 * | 8/2012 | Fletcher | F21V 29/773 |
| | | | 362/249.02 |
| 2014/0263298 A1 | 9/2014 | Jones et al. | |
| 2014/0268825 A1 | 9/2014 | Lay et al. | |
| 2015/0009676 A1 | 1/2015 | Danesh | |
| 2016/0352087 A1 * | 12/2016 | Wurms | H02G 3/081 |
| 2017/0256930 A1 * | 9/2017 | Wurms | H02G 3/185 |
| 2018/0017243 A1 | 1/2018 | Palmer | |

FOREIGN PATENT DOCUMENTS

| | | | | |
|---|---|---|---|---|
| CA | 150014 | | 3/2014 | |
| CA | 154612 | | 3/2014 | |
| CN | 216086357 U | * | 3/2022 | |
| JP | 3161293 U | * | 7/2010 | F21S 45/48 |

\* cited by examiner

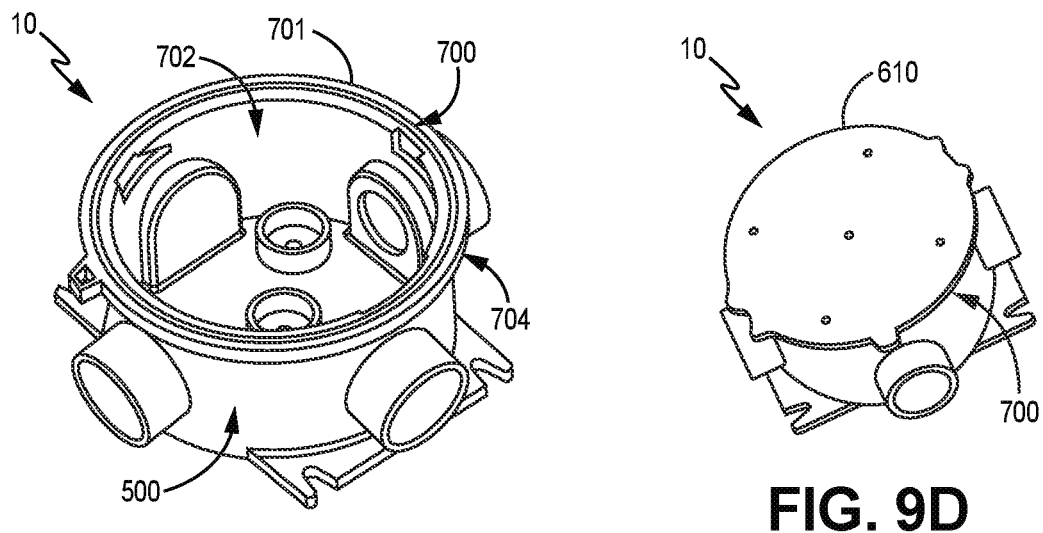
FIG. 9C
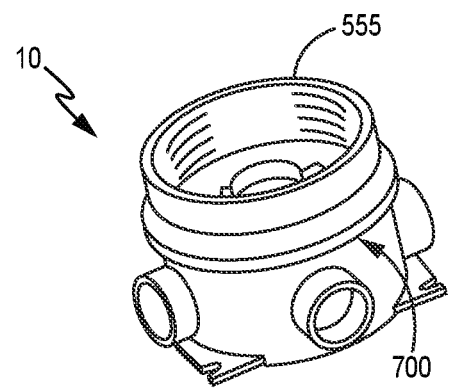
FIG. 9D
FIG. 9E

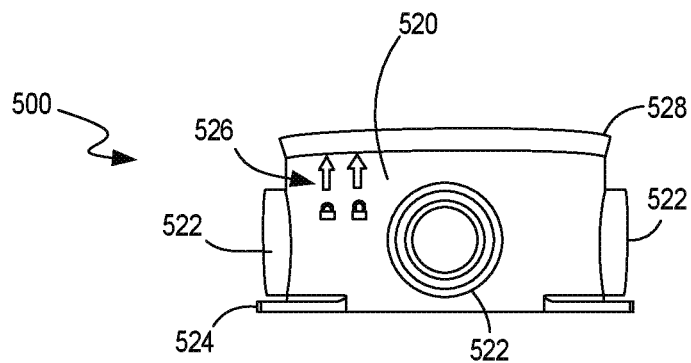
FIG. 11A
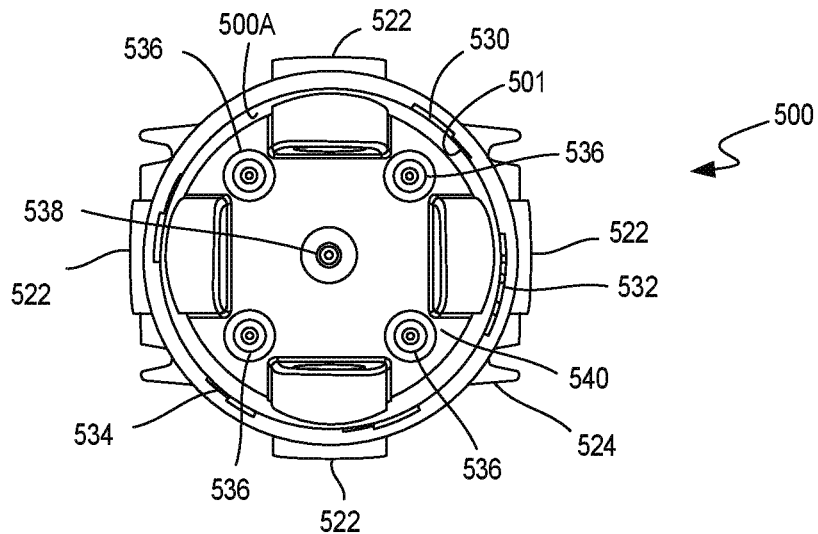
FIG. 11B
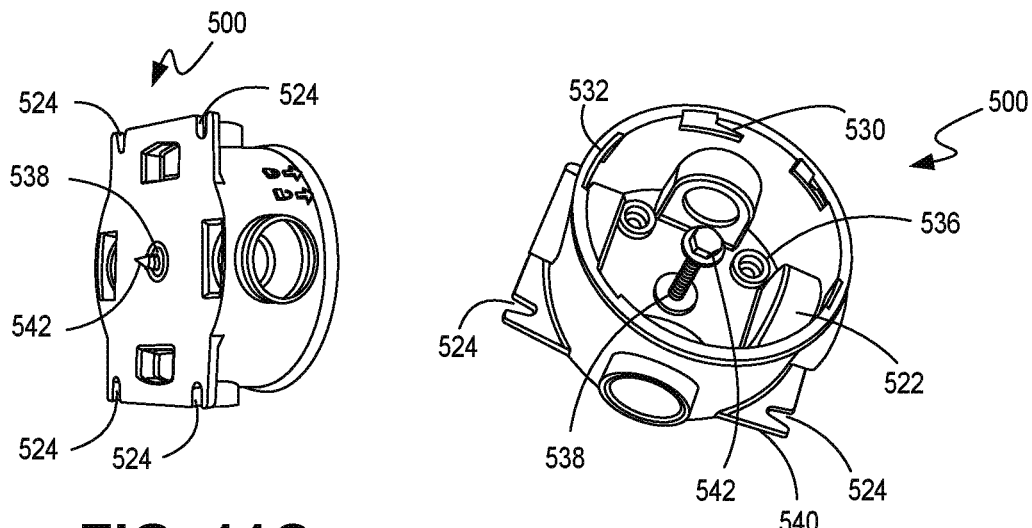
FIG. 11C
FIG. 11D

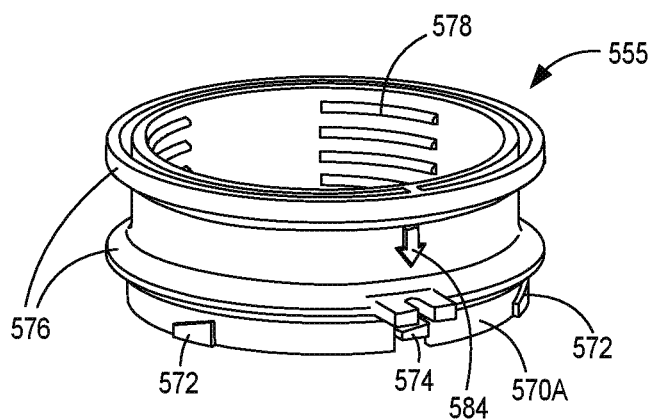
FIG. 14A
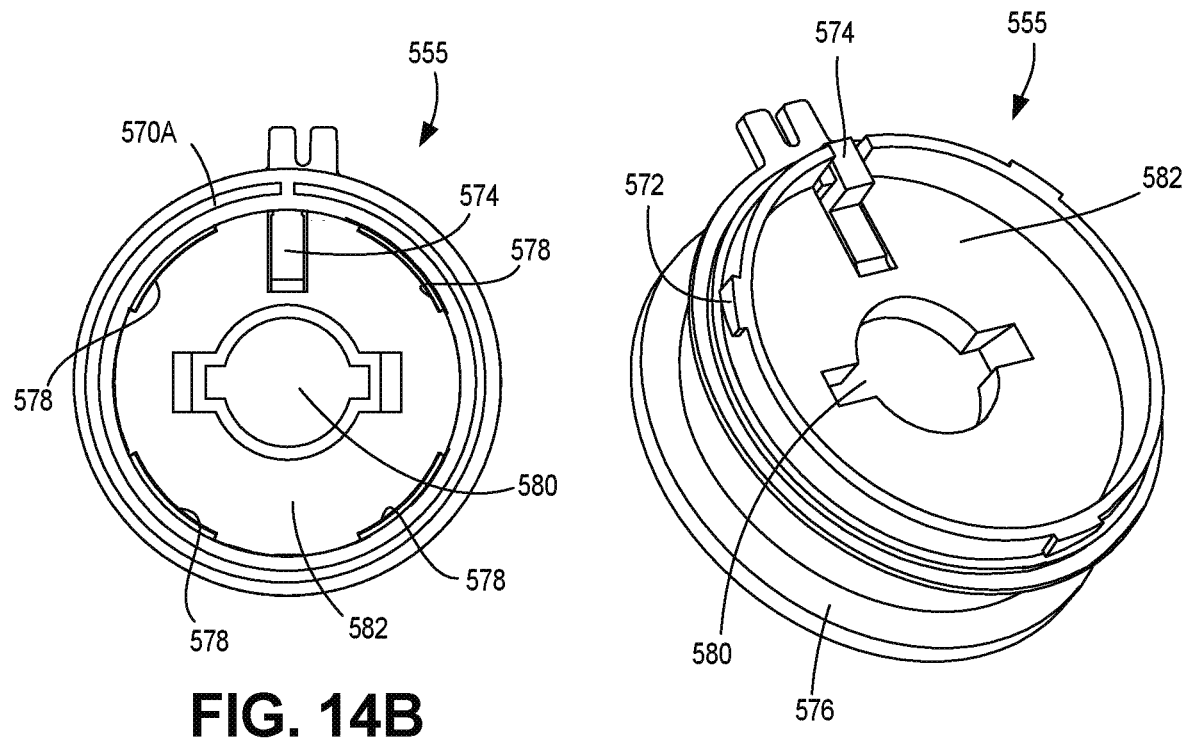
FIG. 14B
FIG. 14C

JUNCTION BOX AND LIGHTING ASSEMBLY WITH O-RING AND RELATED SYSTEMS AND METHODS

CROSS-REFERENCE TO RELATED APPLICATION(S)

This application is a continuation of U.S. application Ser. No. 15/669,415, filed Aug. 4, 2017, and entitled "Unitary LED Lighting Assembly with O-Ring and Related Systems and Methods," which is a continuation in part of U.S. application Ser. No. 15/006,990, filed on Jan. 26, 2016 and entitled "Modular LED Lighting Assembly and Related Systems and Methods," now U.S. Pat. No. 9,803,844 which claims priority to the following: U.S. Provisional Application No. 62/107,810, filed Jan. 26, 2015 and entitled "Unitary LED Light;" U.S. Provisional Application No. 62/155,983, filed on May 1, 2015, and entitled "LED Light Fixture;" and U.S. Provisional Application No. 62/204,599, filed on Aug. 13, 2015 and entitled "Screw-Less and Tool-Less Twist and Lock Fixture Assembly," each of which is hereby incorporated by reference in its entirety; U.S. application Ser. No. 15/669,415 also claims priority under 35 U.S.C. § 119(e) to U.S. Provisional Application No. 62/371,042, entitled "Unitary LED Light Assembly with O-Ring and Related Systems and Methods," filed Aug. 4, 2016, each of which hereby incorporated by reference in its entirety for all purposes.

TECHNICAL FIELD

The disclosure relates to modular LED lighting elements, and more particularly to a modular LED lighting system featuring various interconnectable components.

BACKGROUND

Existing "wet" locations such as agricultural barns and livestock buildings typically have watertight incandescent light fixtures, sometimes called "Jar Fixtures", "Utility fixtures" or "Jelly Jar Fixtures." These fixtures are typically comprised of a standard light bulb (lamp) socket, such as an Edison socket, disposed within a larger threaded base fixture. As skilled artisans would appreciate, a variety of other sockets may be used. The base fixture is in turn configured to receive a watertight threaded glass jar that can easily and conveniently be threadably connected with the threaded base to enclose the electric lamp socket (and its light source (lamp) such as an incandescent or compact fluorescent connected thereto).

Accordingly, an LED Light capable of coupling to an existing base was previously developed, as is found in provisional application 62/107,810, filed Jan. 26, 2015 and entitled "Unitary LED Light," which is hereby incorporated by reference in its entirety. A watertight junction box was developed as a further implementation of a modular LED light system was filed as on May 1, 2015 as provisional application 62/155,983 and entitled "LED Light Fixture," which is also hereby incorporated by reference in its entirety. Further improvements to the junction box and sub-assembly components were represented in provisional application 62/204,599, filed on Aug. 13, 2015 and entitled "Screw-Less and Tool-Less Twist and Lock Fixture Assembly," which is also hereby incorporated by reference in its entirety.

The present disclosure seeks to expand upon this technology by providing a modular LED lighting and electrical junction enclosure system 1 which incorporates an LED lamp and various connection and enclosure components. For example, in certain implementations the LED lamp is capable of being retrofitted into an existing electric lamp socketed fixture, while in alternate embodiments, an improved fastener-less and tool-less twist and lock is provided for faster, more efficient, watertight installation. The various embodiments provided can be installed in wet location settings such as agricultural, commercial, industrial and residential areas, and is adapted to work with low wattage light sources such as light-emitting diode ("LED") and compact fluorescent lamp ("CFL") lights. Additionally, the electrical junction enclosure (commonly referred to as an "outlet box") is capable of replacing several existing electrical enclosure sizes with just one universal size enclosure with an improved fastener-less and tool-less twist and lock assembly.

BRIEF SUMMARY

Discussed herein are various embodiments relating to a novel modular LED lighting assembly and electrical enclosure. Certain implementations include a fixture body, junction box, sub assembly and various associated components that are configured to be assembled to provide LED lighting solutions and electrical junction enclosures, including retrofitting solutions.

One example includes a unified LED light for installation on an existing socket, including: a fluidically-sealed light component including: a cover base including a heat sink, at least one LED light, a control unit, and a cover, where the LED light and heat sink are disposed between the cover base and the cover, a substantially cylindrical central housing including: a fan, at least one intake port, and at least one drain configured to prevent the accumulation of water within the substantially cylindrical central housing, and a substantially cylindrical coupling component including: a central lumen including a socket adaptor, and a threaded base adaptor, where substantially cylindrical central housing is disposed between the light component and the substantially cylindrical coupling component.

Implementations may include one or more of the following features. The unified LED light where the socket adapter is configured to electrically couple with an existing socket so as be in electronic communication without the use of a dongle. The unified LED light where the socket adaptor includes: a contact pin, line voltage wires, and contact slides, where the contact slides are configured to be in electrical communication with the sides of the existing socket. The unified LED light where the substantially cylindrical housing includes a body, the body including an external ring, an angled internal face, and an internal ring, where the internal ring is configured to house the fan. The unified LED light further including at least one side drain disposed in the substantially cylindrical coupling component configured to facilitate the movement of water from the central lumen. The unified LED light where the threaded base adapter includes threads configured to threadably mate with the threads of an existing socket base with the threads originally meant to hold a glass or poly jar or cover of similar materials of an existing electric feature. The modular LED light where the junction box is configured to be tool-less. The modular LED light where the junction box is configured to twist and lock. The modular LED light where the junction box further includes a sub-assembly. The modular LED light where the junction box further includes a fluidically-sealed captive fastener. The modular LED light where the junction box is configured to couple to a traditional luminaire body. The modular LED light where the at least one side drain is disposed in the substantially cylindrical coupling component configured to facilitate the movement of water outside of the central lumen. The modular LED system further including a junction box. The modular LED system further including a traditional junction box adapter. The modular LED system where the substantially cylindrical coupling component is selectively coupleable to the twist and lock luminaire body. The modular LED system where the twist and lock luminaire body includes a coupling portion and a circular fitting. The modular LED system where the at least one side drain is disposed in the substantially cylindrical coupling component configured to facilitate the movement of water outside of the central lumen. The modular LED system where the socket adaptor includes: a contact pin, line voltage wires, and contact slides.

One example includes a modular LED light, including: a fluidically-sealed light component including: a cover base including a heat sink, at least one LED light, a control unit, and a cover, where the LED light and heat sink are disposed between the cover base and the cover, a substantially cylindrical central housing including: a fan, at least one intake port, and at least one drain configured to prevent the accumulation of water within the substantially cylindrical central housing, and a substantially cylindrical coupling component including: a central lumen including a socket adaptor, a threaded base adaptor, and at least one side drain, and a junction box including: a generally circular housing, and internal lumen, and an internal coupling region.

Implementations may include one or more of the following features. The modular LED light where the junction box is configured to be tool-less. The modular LED light where the junction box is configured to twist and lock. The modular LED light where the junction box further includes a subassembly. The modular LED light where the junction box further includes a fluidically-sealed captive fastener. The modular LED light wherein the junction box includes an embedded O-ring which eliminates screws and connectors, creating a watertight seal and increasing efficiency of installation. The modular LED light where the junction box is configured to couple to a traditional luminaire body. The modular LED light where the at least one side drain is disposed in the substantially cylindrical coupling component configured to facilitate the movement of water outside of the central lumen. The modular LED system further including a junction box. The modular LED system further including a traditional junction box adapter. The modular LED system where the substantially cylindrical coupling component is selectively coupleable to the twist and lock luminaire body. The modular LED system where the twist and lock luminaire body includes a coupling portion and a circular fitting. The modular LED system where the at least one side drain is disposed in the substantially cylindrical coupling component configured to facilitate the movement of water outside of the central lumen. The modular LED system where the socket adaptor includes: a contact pin, line voltage wires, and contact slides.

One example includes a modular LED light system including: a fluidically-sealed light component including: a cover base including a heat sink, at least one LED light, a control unit, and a cover, where the LED light and heat sink are disposed between the cover base and the cover, a substantially cylindrical central housing including: a fan, at least one intake port, and at least one drain configured to prevent the accumulation of water within the substantially cylindrical central housing, and a substantially cylindrical coupling component including: a central lumen including a socket adaptor, a threaded base adaptor, and at least one side drain, and a twist and lock luminaire body.

Implementations may include one or more of the following features. The modular LED system further including a junction box. The modular LED system further including a traditional junction box adapter. The modular LED system where the substantially cylindrical coupling component is selectively coupleable to the twist and lock luminaire body. The modular LED system where the twist and lock luminaire body includes a coupling portion and a circular fitting. The modular LED system where the at least one side drain is disposed in the substantially cylindrical coupling component configured to facilitate the movement of water outside of the central lumen. The modular LED system where the socket adaptor includes: a contact pin, line voltage wires, and contact slides.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 9C is an exploded top view of a junction box with an O-ring secured between an inner and outer wall.

FIG. 9D is a top view of the junction box with cover installed over the O-ring to create a water-tight seal.

FIG. 9E is a top view of the junction box with a water-tight seal where the luminaire body is attached to junction box.

FIG. 11A is a side view of a junction box, according to an exemplary embodiment of the modular LED system.

FIG. 11B is a bottom view of the embodiment of FIG. 11A.

FIG. 11C is a side perspective bottom view of the embodiment of FIG. 11A, showing the captive fastener.

FIG. 11D is a perspective top view of the embodiment of FIG. 11A, showing the captive fastener.

FIG. 14A is perspective side view of a luminaire body, according to an exemplary embodiment.

FIG. 14B is a bottom view of the embodiment of FIG. 14A.

FIG. 14C is a top perspective view of the embodiment of FIG. 14A.

DETAILED DESCRIPTION

Certain embodiments disclosed herein relate to a modular light-emitting diode ("LED") lighting system 1. In certain implementations, the LED lighting system 1 provides a novel LED lamp 10 that is configured to be installed on an existing Edison light socket. In further implementations, the system 1 also has a junction box and sub-assembly that can be installed in place of existing Edison light sockets and interact with an LED lamp. Further embodiments disclosed herein relate to a novel fixture or luminaire body, junction box and sub assembly that can be installed in wet location settings such as agricultural use and is adapted to work with modern low wattage light sources such as LED and compact fluorescent lamp ("CFL").

Figure 1A:
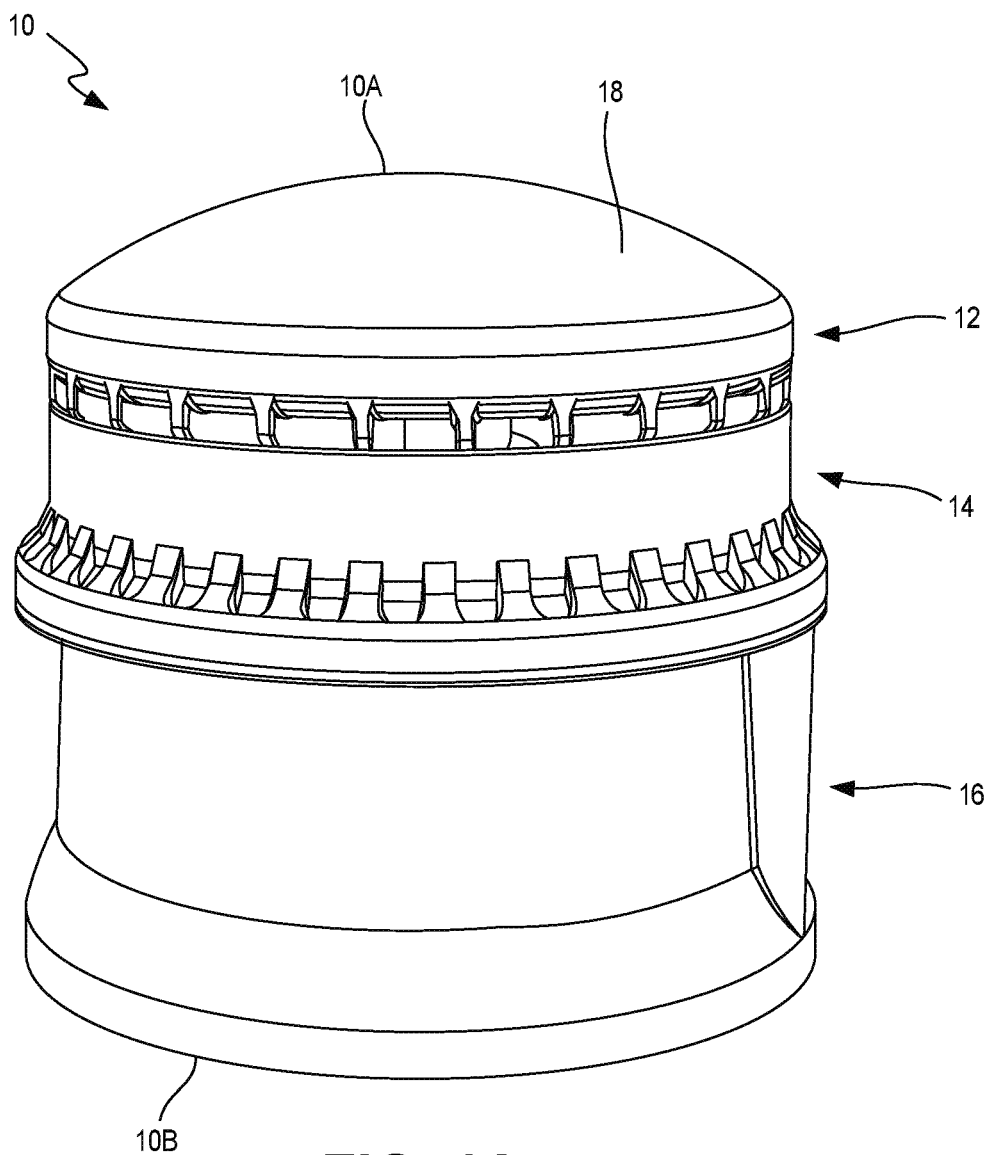
FIG. 1A is a side view of an exemplary embodiment of an LED light fixture coupled to an existing threaded jar fixture base.

In FIGS. 1A-4D, a waterproof and shatterproof LED lamp 10 is provided according to one embodiment of the system 1. This LED lamp 10 is capable of being directly coupled to existing incandescent fixtures (as shown at the base 16) typically used in agricultural buildings without the use of dongles or other attachment cords. That is, in one aspect, the disclosure relates to various embodiments of related modular LED light components, systems and methods that can replace screw-in incandescent light bulbs, including the glass jar lights known as a Jar Fixture. As shown in FIG. 1A and discussed throughout, the lamp 10 is generally cylindrical and has a first end 10A and a second end 10B, wherein the lamp 10 is typically mounted by the second end 10B such that the first end 10A is oriented generally downward. Other implementations are possible.

In FIGS. 5-8B, a socket sub-assembly 100 and junction box 200 are provided according to an exemplary embodiment of the modular LED system. In FIGS. 9A-16C, further modular LED components, such as junction boxes 500, sub-assemblies, utility jar fixtures and related apparatus are provided. Together, this modular LED system is designed for installation in agricultural and other commercial, industrial and residential settings.

Turning to the drawings in greater detail, FIG. 1A shows one embodiment of an LED lamp 10, according to one implementation. In this implementation, the lamp 10 comprises a light component 12 and a central housing 14 coupled to a base 16 (or "luminaire body"), such as the threaded jar fixture base 16 shown in the drawings. In certain implementations, the base 16 can be an existing base, while in alternative embodiments, and as described in detail below, other modular components can be utilized to couple with the LED lamp 10, such as luminaire bodies and/or junction boxes, as discussed for example in relation to FIGS. 9A-9B. The light component 12 also comprises a translucent or transparent cover 18 and LED light 20 (shown in FIG. 2G). In exemplary embodiments, the lamp 10 is capable of producing at least 1000 lm, and operating in temperatures between −20 and 80 degrees C. while operating on 110-120V and less than 14 W. In these embodiments, the lamp 10 can be used in place of incandescent lights of up to 125 W.

Figure 1B:
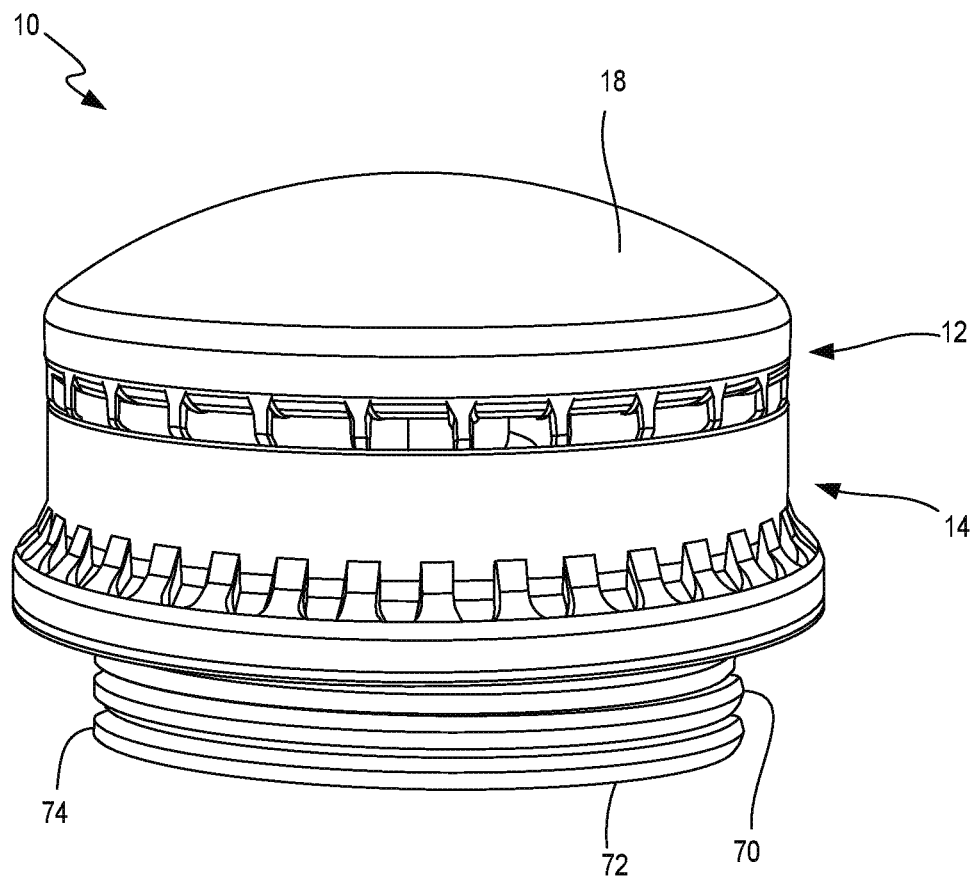
FIG. 1B is a top perspective view of LED lamp embodiment of FIG. 1A.

As shown in FIG. 1B, in certain implementations the LED lamp 10 has a one-piece configuration including a coupling component 70 that can be threadably coupled to an existing glass jar threads of a base 16 and automatically couple electrically with the existing socket as the fixture is coupled to the glass jar threads. Further discussion of the coupling component 70 is found below in relation to FIGS. 3A-4D.

Figure 1C:
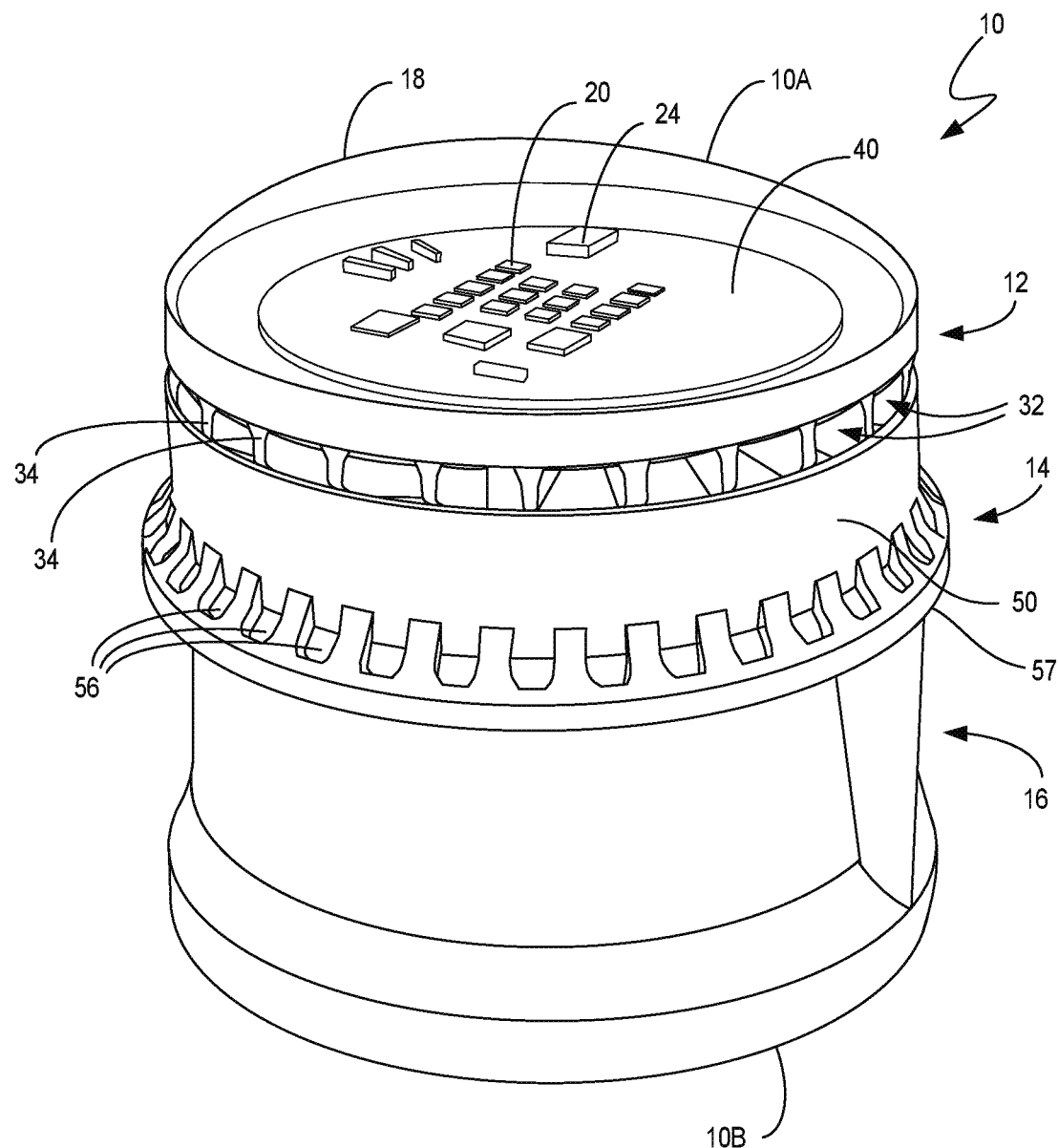
FIG. 1C is a perspective, cutaway view of the embodiment of FIG. 1A.
Figure 1D:
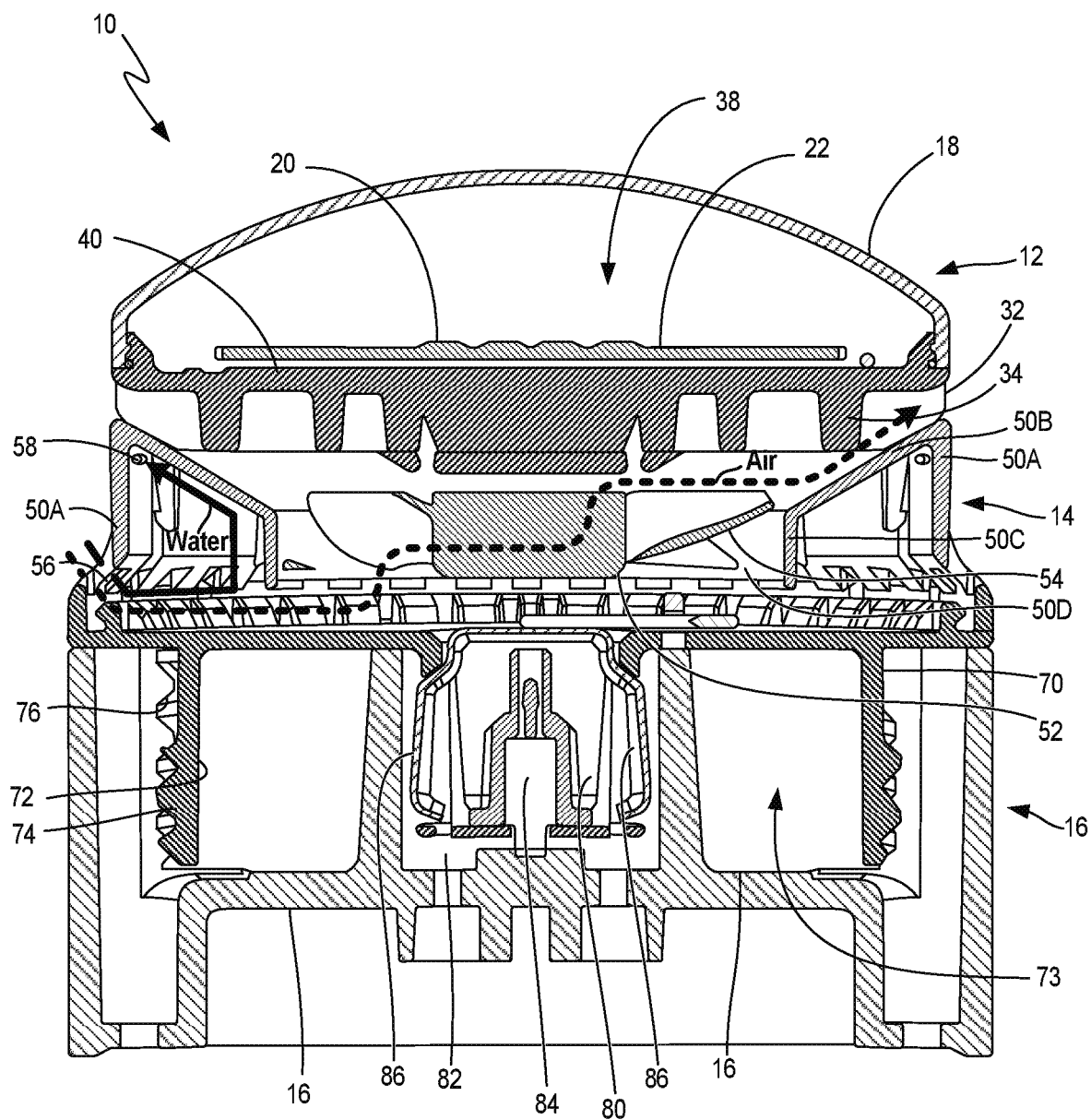
FIG. 1D is a cross-sectional view of the embodiment of FIG. 1A.
Figure 1E:
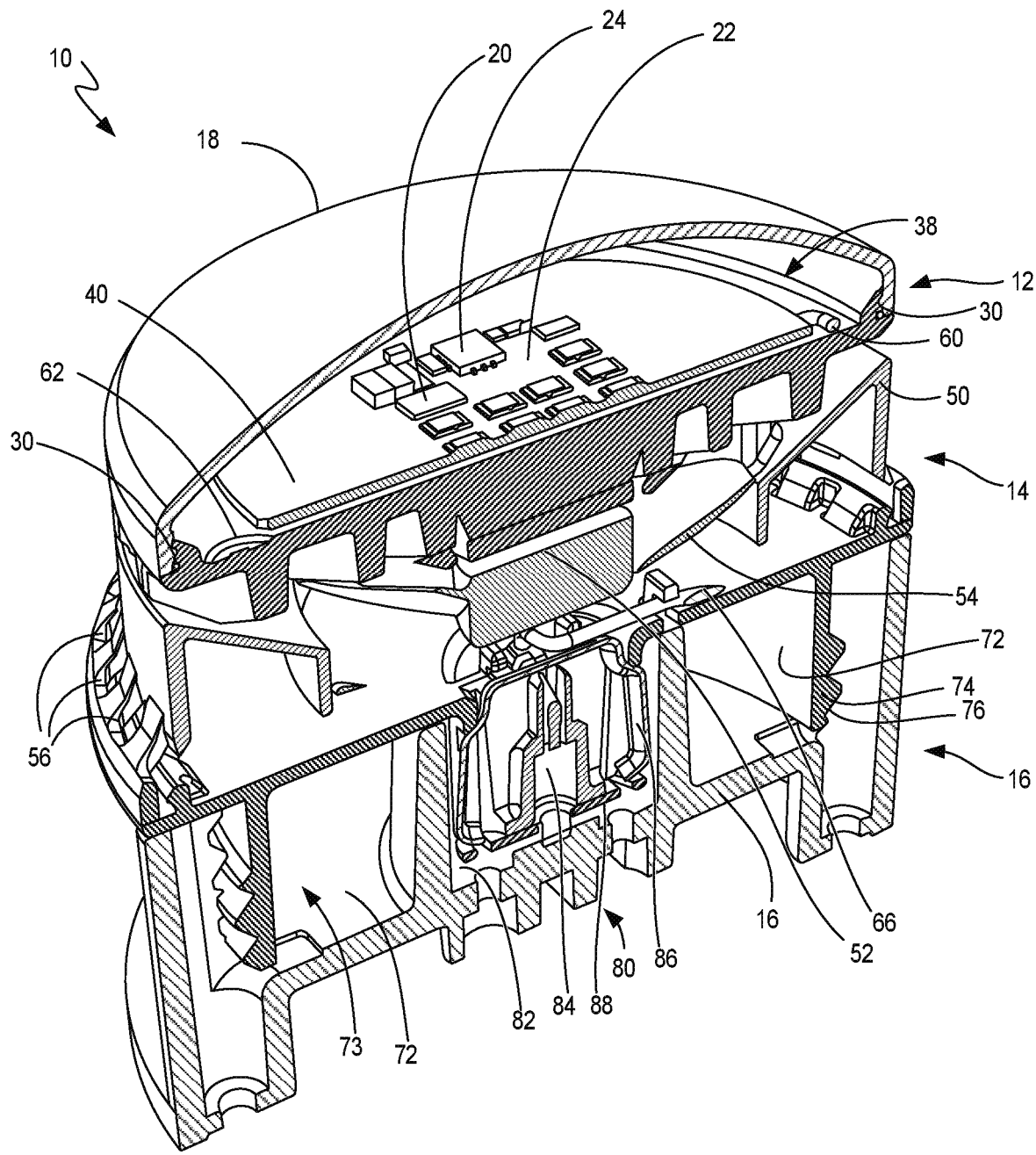
FIG. 1E is a perspective cross-sectional view of the embodiment of FIG. 1A.

FIGS. 1C-E depict various implementations of the assembled lamp 10, with the various components being discussed in detail in relation to FIGS. 2A-4D. As best shown in FIGS. 1C-D, the assembled lamp 10 according to one implementation has a printed circuit board ("PCB") or control unit 22 disposed within the light component 12, along with a heat sink 40. In certain embodiments, the heat sink can be integrated into or otherwise be the cover base 28. In alternate implementations, the heat sink 40 can be mounted on the top cover base side 28A (best shown in FIGS. 2A-C). In various implementations, the heat sink or cover base 28 are metal or other heat sink materials known to those of skill in the art. In certain implementations, the heat sink 40 is substantially the only metal component of the LED lamp 10, with the remaining components being plastic or other composite or polymer materials.

Continuing with FIGS. 1C-E, the cover base 28 is fluidically-sealed to the housing 14 such that water does not enter the cover 18 and damage the control unit 22 and other electrical components. The housing 14 generally has a substantially cylindrical hollow body 50. In the implementation of FIGS. 1C-E, the body 50 has an external ring 50A, an angled internal face 50B and an internal ring 50C configured to house various internal components, such as the fan motor 52 within the internal ring lumen 50D. In these implementations, the fan motor 52 is fluidically-sealed and operationally coupled to fan blades 54 so as to operate within the internal ring lumen 50D in a relatively low water environment, meaning that water will not accumulate within the internal ring lumen 50D, as any water which does enter the ring lumen will be able to flow out the vents 32 along with the exiting air.

Continuing with FIGS. 1C-E, the body 50 can also have cooling air intake ports 56 disposed radially around the body 50. In the implementation of FIGS. 1C-D, an outer ridge 57, such as a flared outer ridge 57, encircles the body 50 near the air intake ports 56. In these implementations, the fan motor 52 can be actuated to turn the fan blades 54. The fan blades 54 generate a flow of air, pulling ambient air into the central housing 14 through the intake ports 56 and forcing the air through the air exhaust vents 32, thereby helping to cool the light component 12 by dissipating at least some of the heat generated by the LED lights 20.

As best shown in FIG. 1D, in various implementations, water drains 58 are disposed within the body 50 and external ring 50A (best shown in FIGS. 2D and 4D) and configured to allow the flow of water out of the body 50, for example generally toward the first end 10A of the lamp 10. The water drains 58 have openings in the external surface of the body 50, such that the drains 58 help to divert any moisture that enters the lamp 10 through the ceiling above the lamp 10 on the second end 10B.

Continuing with FIG. 1D, water that enters the lamp 10 from the air intake ports 56 or ceiling or any source above the lamp 10 is diverted to the water drains 58 and thus out of the openings in the body 50, thereby diverting the water out of the lamp 10 rather than allowing the water to pool inside the lamp 10. In certain environments, water may collect in the enclosure formed between the external ring 50A, angled internal face 50B and internal ring 50C. This water can also exit the body 50 by way of the drains 58 in the implementation of FIG. 5B. Further, in the event that water enters the internal ring lumen 50D, it will reach the bottom cover base side 28B (also shown in FIG. 2A-C) and flow out the vents 32. Accordingly, the body 50 is adapted to prevent the accumulation of water within the light.

As is also shown in FIGS. 1D-1E, the coupling component 70 has a threaded jar base adapter 72 and a central lumen 73. In these implementations, the threaded jar base adapter 72 has threads 74 that are configured to threadably mate with the threads 76 of an existing jar fixture base 16 (shown in FIG. 2F). The coupling component 70 also has a socket adapter 80 that is configured to be positioned within and electrically couple with the socket 82 of the existing base 16 without the need for a dongle, as had been done in the prior art. Further discussion of the coupling component 70 and related components is found in relation to FIGS. 2E, 3A and 4A-D, while further discussion of the socket adaptor 80 is below in relation to FIGS. 3B-4B.

Figure 2A:
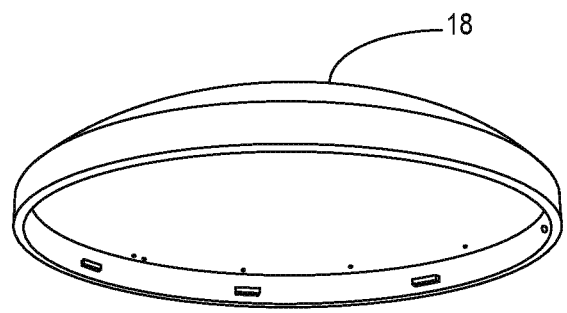
FIG. 2A is a bottom perspective view of a lens according to the embodiment of FIG. 1A
Figure 2B:
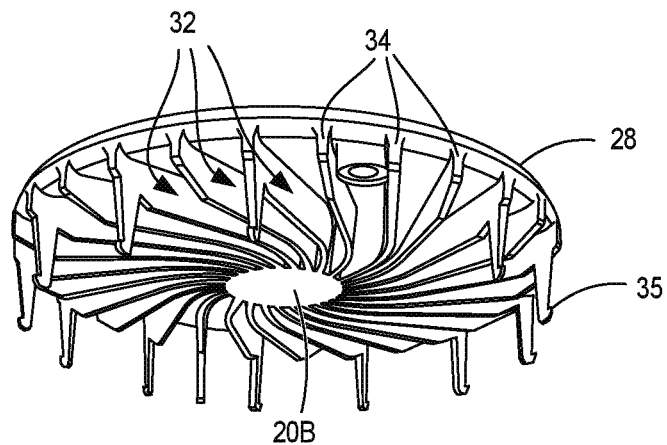
FIG. 2B is a bottom perspective view of a cover base, according to an exemplary embodiment.
Figure 2C:
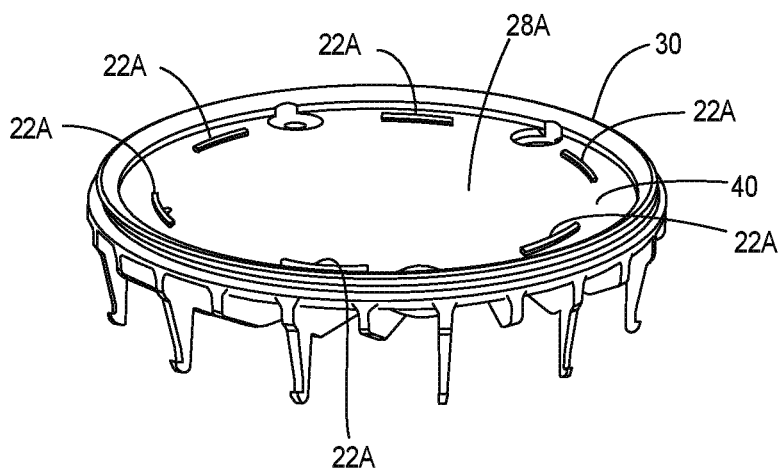
FIG. 2C is a top perspective view of the cover base of FIG. 2B.

Turning to the individual components of various implementations in greater detail, as best shown in the implementations of FIGS. 2A-2C, the light component 12 has a cover base 28 having a top cover base side 28A and bottom cover base side 28B. The top cover base side 28A has at least one PCB alignment fastener 22A disposed on it, to allow for attachment of the control unit 22, which in this implementation is a printed circuit board. As would be appreciated by a skilled artisan, this can be a "snap on" attachment in certain configurations.

Continuing with FIGS. 2A-C, the cover base 28 is coupled to a light cover 18 to create a fluidically sealed lamp enclosure 38 (as best shown in FIGS. 1C-E). The light component 12 also has a cover waterproofing gasket 30 that helps to maintain a fluidic seal between the interior of the cover 18 and the ambient air external to the lamp 10. In addition, the cover base 28 in this embodiment has air exhaust vents 32 defined or formed on the underside of the cover base 28, with external projections 34 formed around the outer perimeter of the air exhaust vents 32. The external projections 34 extend from the base 28, thereby forming air exhaust vents 32 in fluid communication with the vents 32, as best shown in FIGS. 1C-E.

Figure 2D:
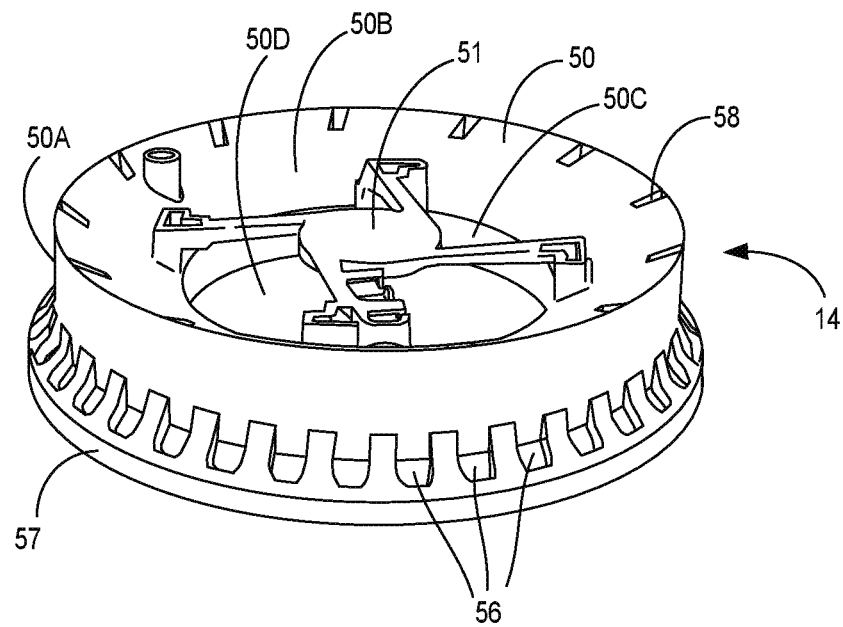
FIG. 2D is a top perspective view of the central housing, according to an exemplary embodiment.

As best shown in FIGS. 2B and 2D, at least one of the external projections 34 can further comprise a latching projection 35 that can be snapped into openings (not shown) in the central housing 14 so as to mount it to the housing, as is shown for example in FIG. 2A. In addition, the lamp 10 is fluidically sealed such that the interior of the lamp 10 is waterproof while allowing any water that enters the interior to exit through drains 58 provided in the lamp 10, as is shown in FIG. 1D.

As best shown in FIG. 2D, the central housing 14 has a body 50 with an external ring 50A, an angled internal face 50B and an internal ring 50C. A fan support 51 having a fan shroud 51A enclosing a fan motor (shown at 52 in FIGS. 1C-E) is disposed within the body 50 such that the fan motor 52 and fan blades 54 are contained within the internal ring 50B and immediately adjacent to the cover base 28 and/or heat sink 40. The fan motor 52 is disposed within the body 50 and operationally coupled to fan blades 54 (shown in FIG. 3A) so as to cool the heat sink. The body 50 can have cooling air intake ports 56 (also shown in FIGS. 1C), and a at least one water drain (as described further in relation to FIGS. 1D and 4D). The fan motor 52 is fluidically sealed and can be electrically actuated by the fan wires 60 to turn the fan blades 54 (shown in FIG. 3A).

Figure 2E:
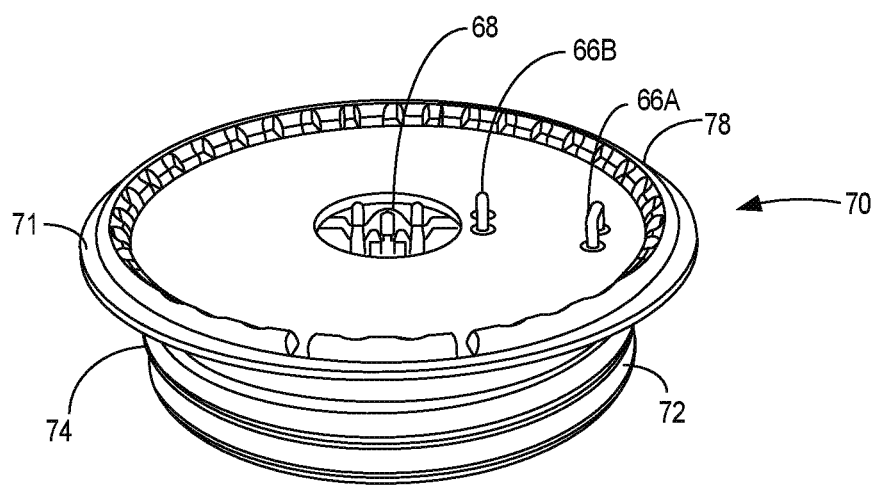
FIG. 2E is a top perspective view of a coupling component, according to an exemplary embodiment.

The upper aspect of an implementation of the coupling component 70 is shown in FIG. 2E. In this implementation, the generally cylindrical coupling component 70 has a cylindrical coupling component ridge 71 and a cylindrical threaded jar base adapter 72. In this implementation, the threaded jar base adapter has threads 74 that are configured to threadably mate with the threads 76 of an existing jar fixture base 16 (shown in FIG. 2F).

Figure 3A:
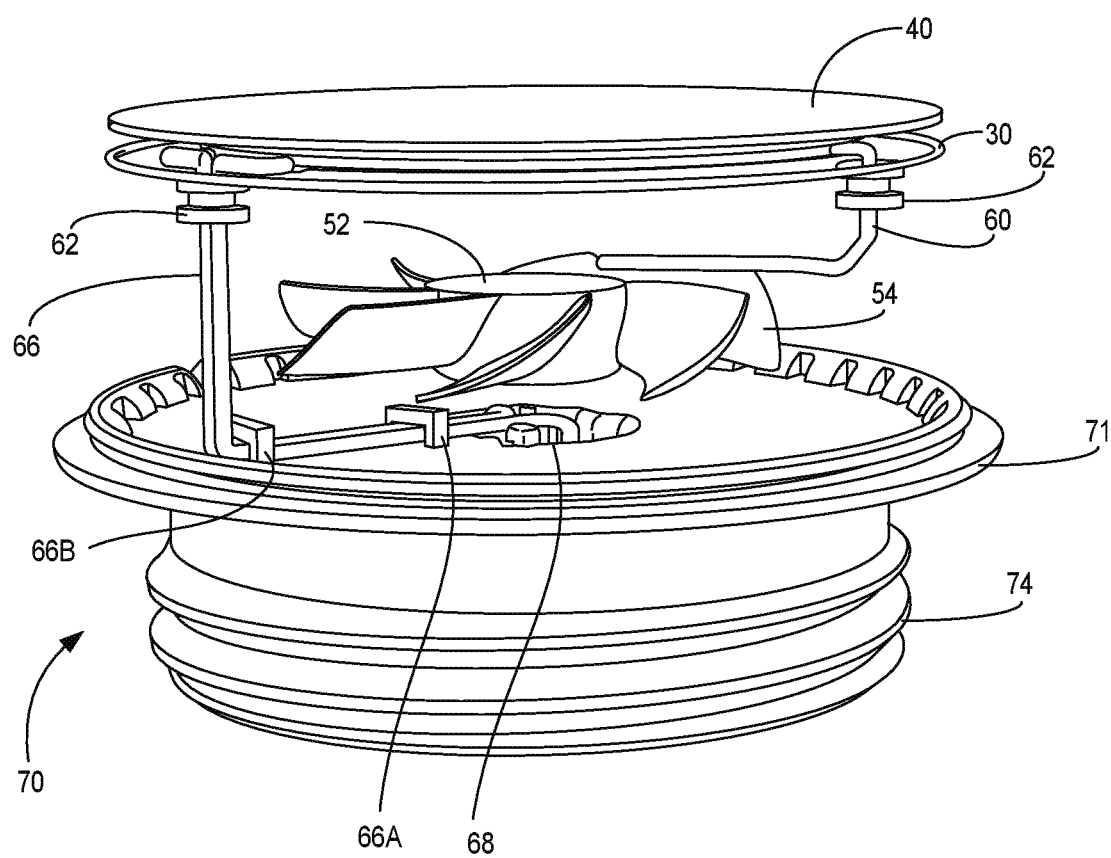
FIG. 3A is a side view of the internal components of the LED lamp between the cover base and coupling component.

Continuing with FIG. 2E, the coupling component 70 further comprises an attachment ring 78 for coupling with the body 50, as well as at least one wire fastener 66A, 66B, such as a clip, and a coupler opening 68 for securing wires from the socket 82 to the lamp light component (as is shown in FIG. 3A).

Figure 2F:
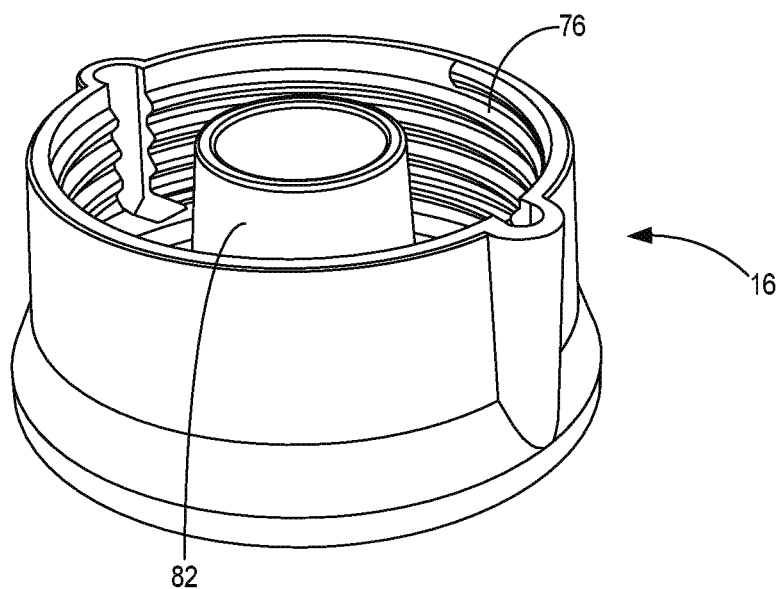
FIG. 2F is a top perspective view of an existing fixture base.
Figure 2G:
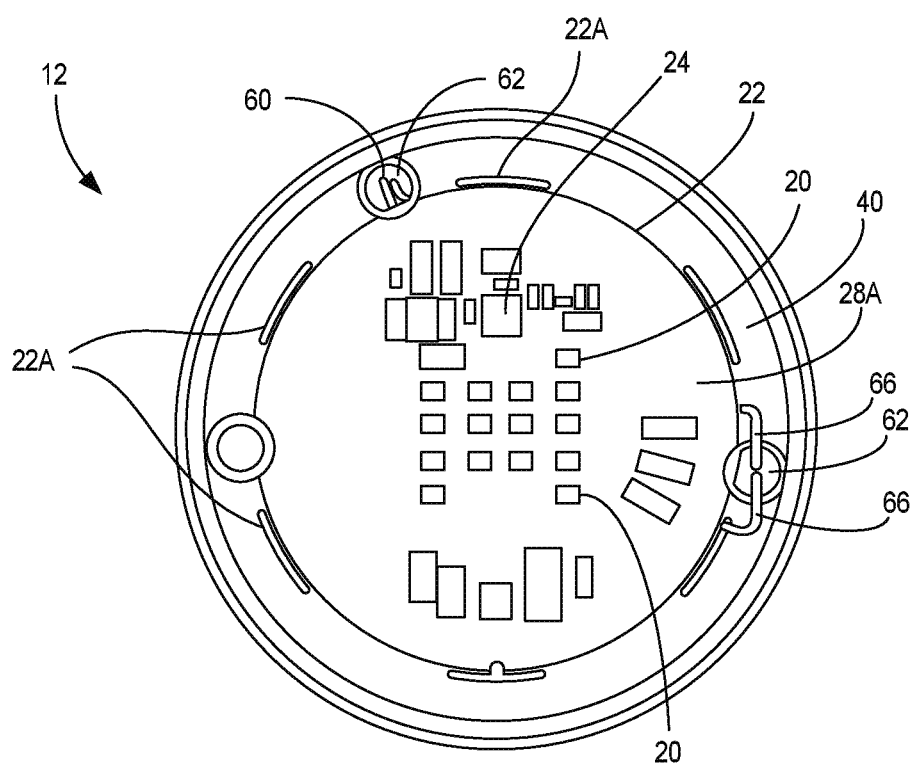
FIG. 2G is a top view of the LED lamp, according to an exemplary embodiment.

As shown in FIG. 2G, the light component 12 in this embodiment of the lamp 10 has a light 20A generally disposed within the light cover 18 on the topside of the cover base 28A, which can be the heat sink 40. The light 20A has multiple LED lights 20 that are disposed on a printed circuit board ("PCB"), standard wafer, operations system, or other control unit 22. More specifically, in this embodiment, the light 20A and control unit 22 are positioned on or adjacent to the top side of the cover base 28A such that the control unit 22 is in electronic communication with the LED lights 20 to illuminate them, as would be understood by one of skill in the art. A plurality of PCB alignment fasteners 22A are also disposed radially around the cover base 28 (or heat sink 40), to secure the control unit 22 in place.

In various implementations, the light component 12 also has a controller 24 for controlling the fan and/or the LED. In one embodiment, the controller 24 is an integrated circuit, processor, or any other type of controller 24 configured to operate the LED lights 20 and fan motor (shown in FIG. 3A at 52). Further, the light component 12 also has a heat sink 40. In this implementation, the heat sink 40 is the cover base 28, but in alternate embodiments can be a distinct component integrated into or otherwise attached to the cover base 28.

As best shown in the implementation of FIG. 3A, fan motor wires 60 extend along the between the controller 24 and fan motor 52 along the cover base 28 by way of waterproofing grommets 62. Line voltage wires 66 similarly extend through the grommets 62 and to the control unit 22 and LED lights 20. Further, the cover base 28 features a waterproofing gasket 30 which surrounds the cover base 28 to create a waterproof seal and prevent the flow of water into the space between the lens cover 18 and cover base 28.

Figure 3B:
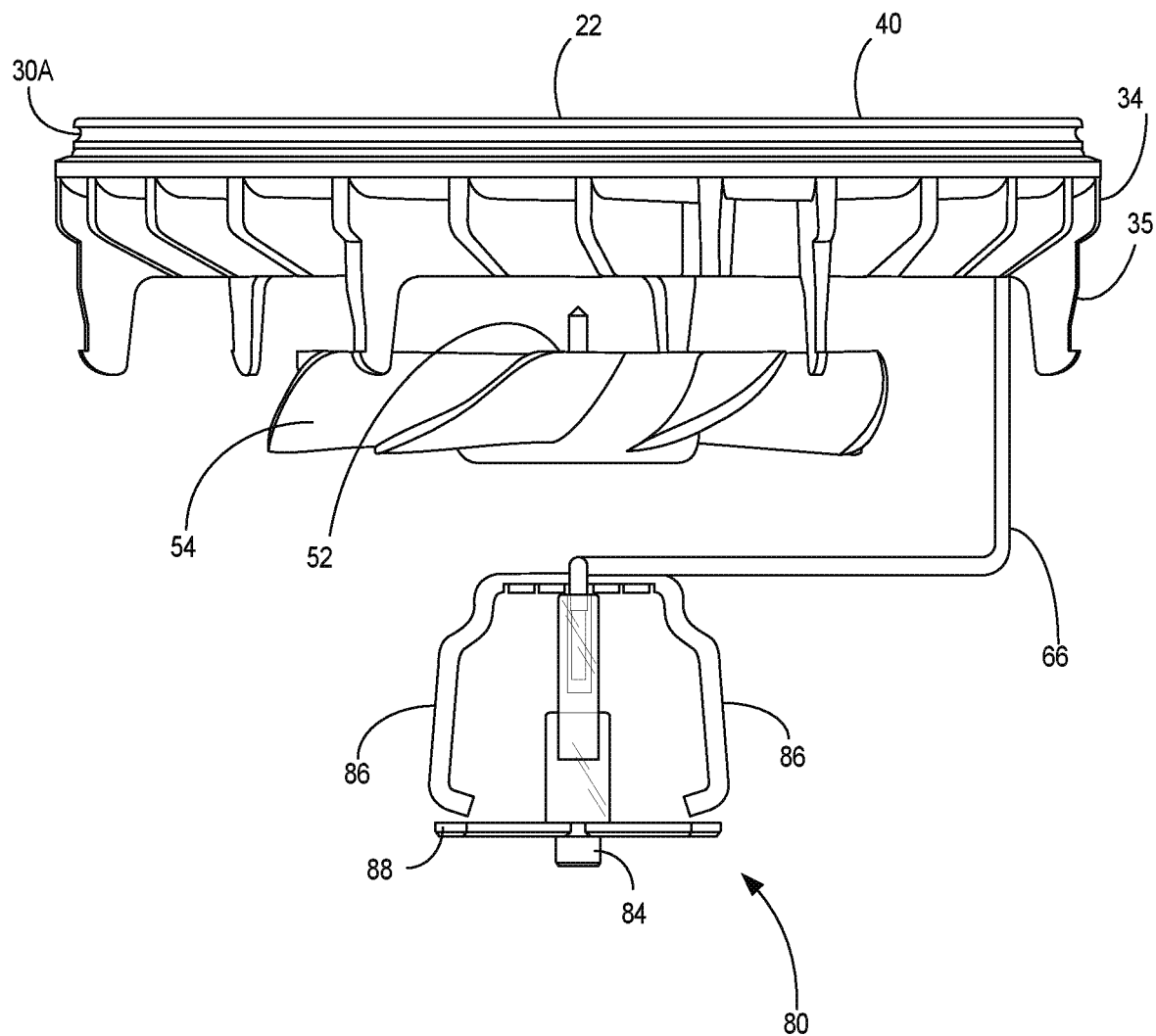
FIG. 3B is a further internal view of the embodiment of FIG. 3A, without the coupling component housing, to show the socket adaptor.
Figure 3C:
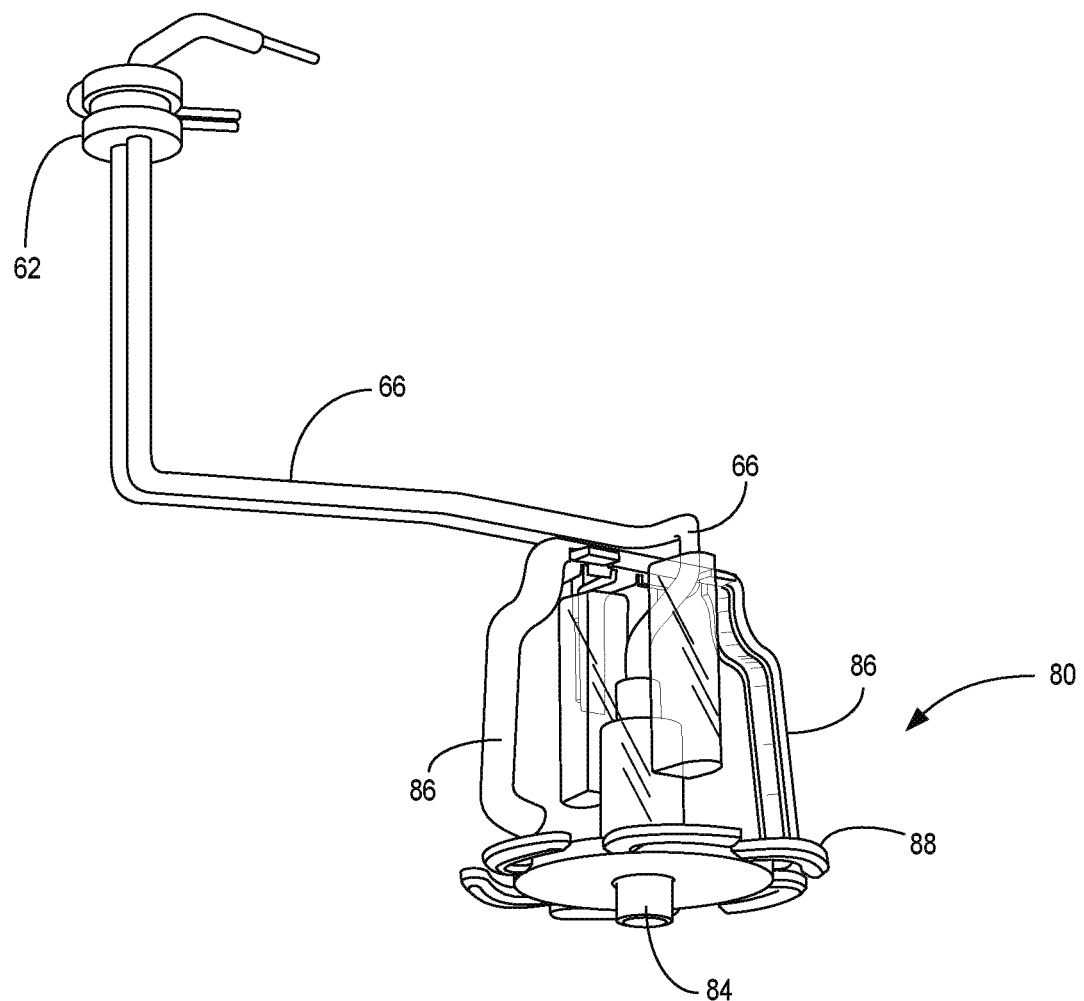
FIG. 3C is a further isolated view of the socket adaptor of FIG. 3B.

FIGS. 3B-C depict the electrical components of the socket adaptor 80. In these embodiments, the socket adapter 80 has a contact pin 84 that is electrically coupled to the central contact pin (not shown) in an Edison socket 82. In certain embodiments, the contact pin 84 is a pogo pin line voltage contact. In these embodiments, the line voltage wires 66 and contact slides 86 that are electrically coupled to the sides of the socket (shown in FIG. 2F). Thus, an electrical connection is created when the contact pin 84 comes into electronic communication with the center pin (not shown) of the socket (shown in FIG. 2F at 82).

Figure 4A:
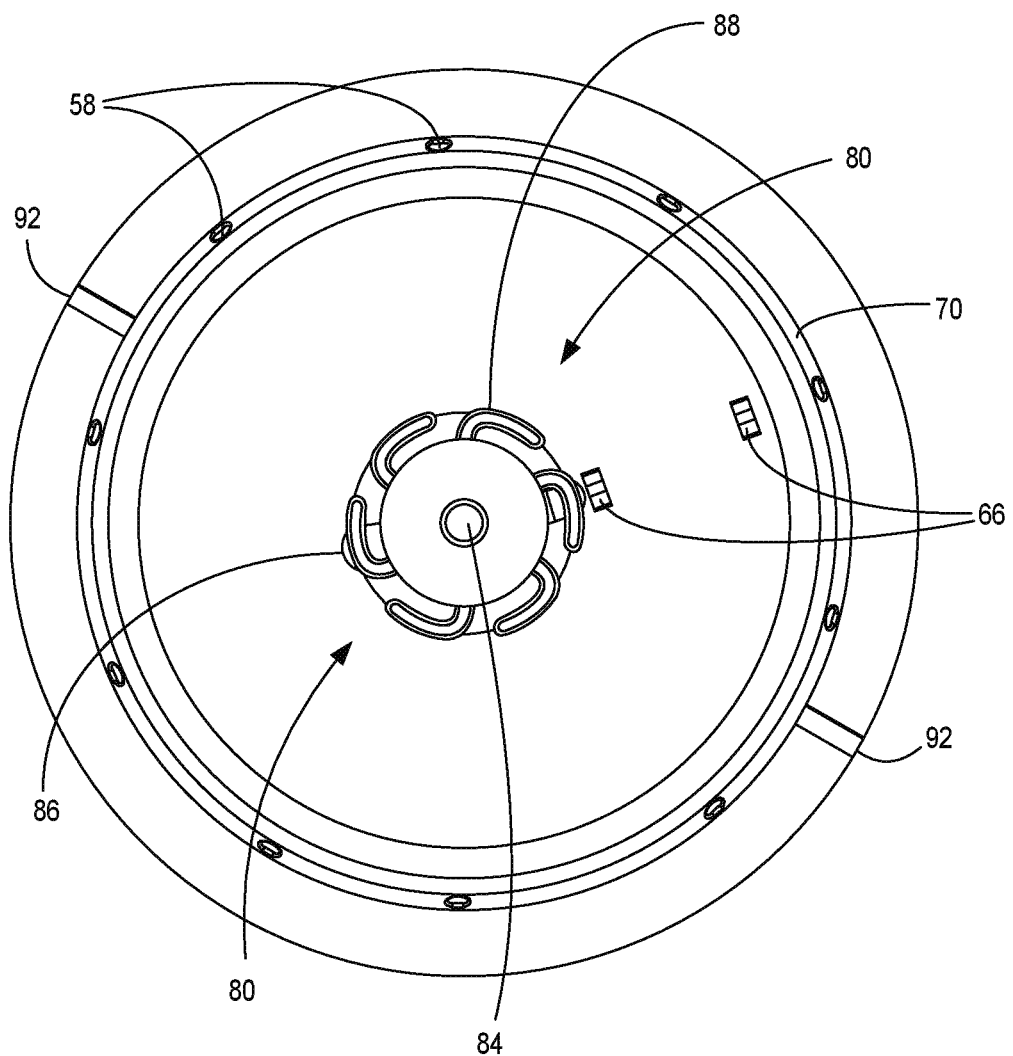
FIG. 4A is a bottom view of the coupling component and socket adaptor, according to an exemplary embodiment.
Figure 4B:
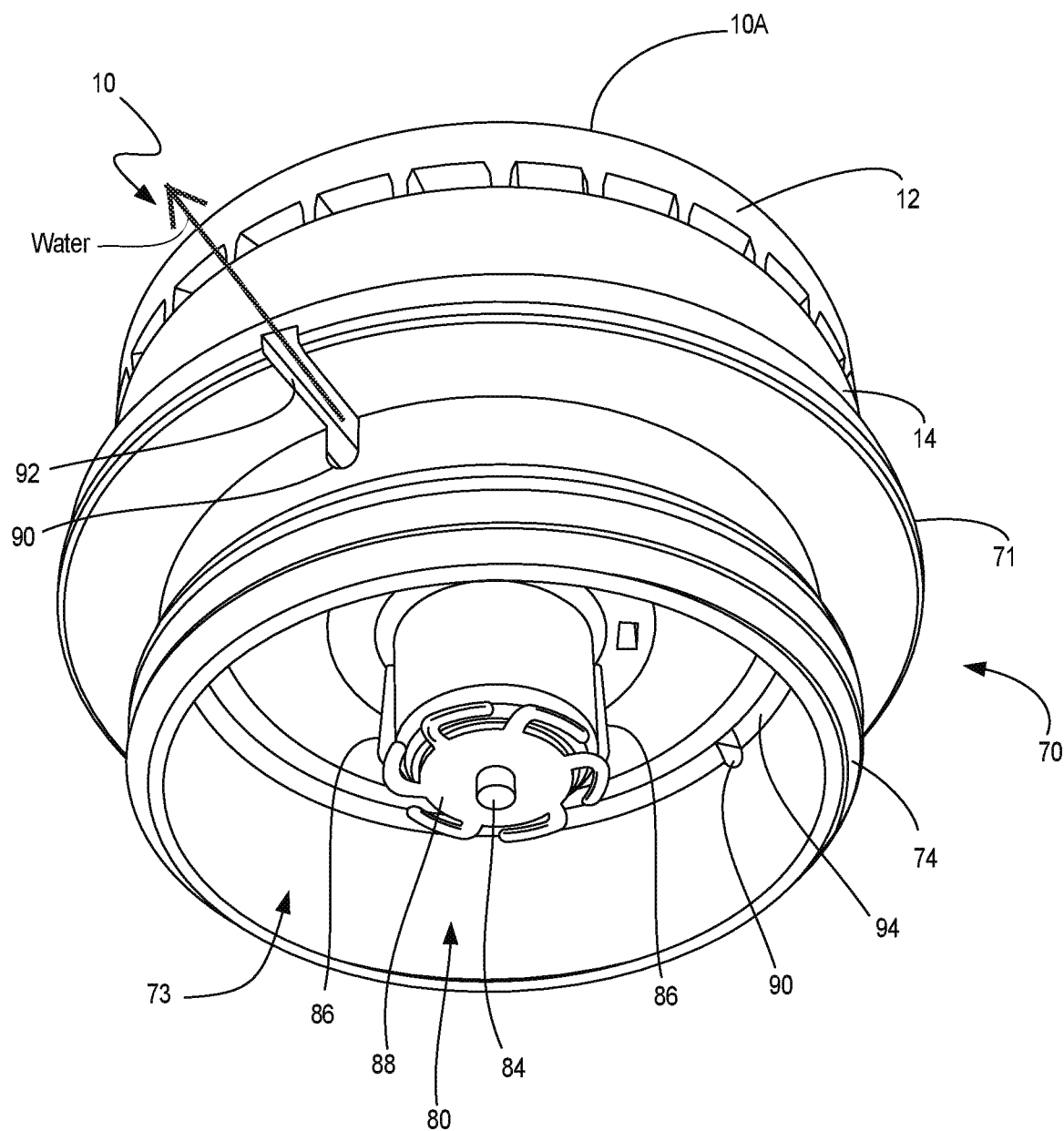
FIG. 4B is a bottom perspective view of the embodiment of FIG. 4A.

FIGS. 4A-B depict the underside of the coupling component 70 and socket adaptor 80. The coupling component 70 also has a socket adapter 80 that is configured to be positioned within and electrically couple with the socket 82 of the existing base 16 (as shown in FIG. 2F) without the need for a dongle, as had been done in the prior art. In these implementations, the socket adaptor 80 has a disc-shaped socket member 88, which can lock out the existing socket 82 from incumbent technologies or prevent the use of old technology in the socket 82, as would be recognized by one of skill in the art. In certain implementations, drains 58 can also be disposed within the coupling component 70 to facilitate the passage of water from above.

As is best shown in the implementations of FIGS. 4A-B, the coupling component 70 has at least one side drain 90 configured to facilitate the movement or water from accumulating within the central lumen 73. A drain path 92 is also provided, the drain path 92 being recessed into the coupling ridge 71 and configured to direct water away from the central lumen 73. As best shown in FIG. 4B, and as one of skill in the art would recognize, the location of the side drain 90 and drain path 92 will vary depending on the installation orientation. For example, the implementation of FIG. 4B is configured to be installed such that the first end 10A is oriented in the direction of gravity. An internal drain channel 94 can also be disposed within the central lumen 73 to facilitate drainage.

Figure 4C:
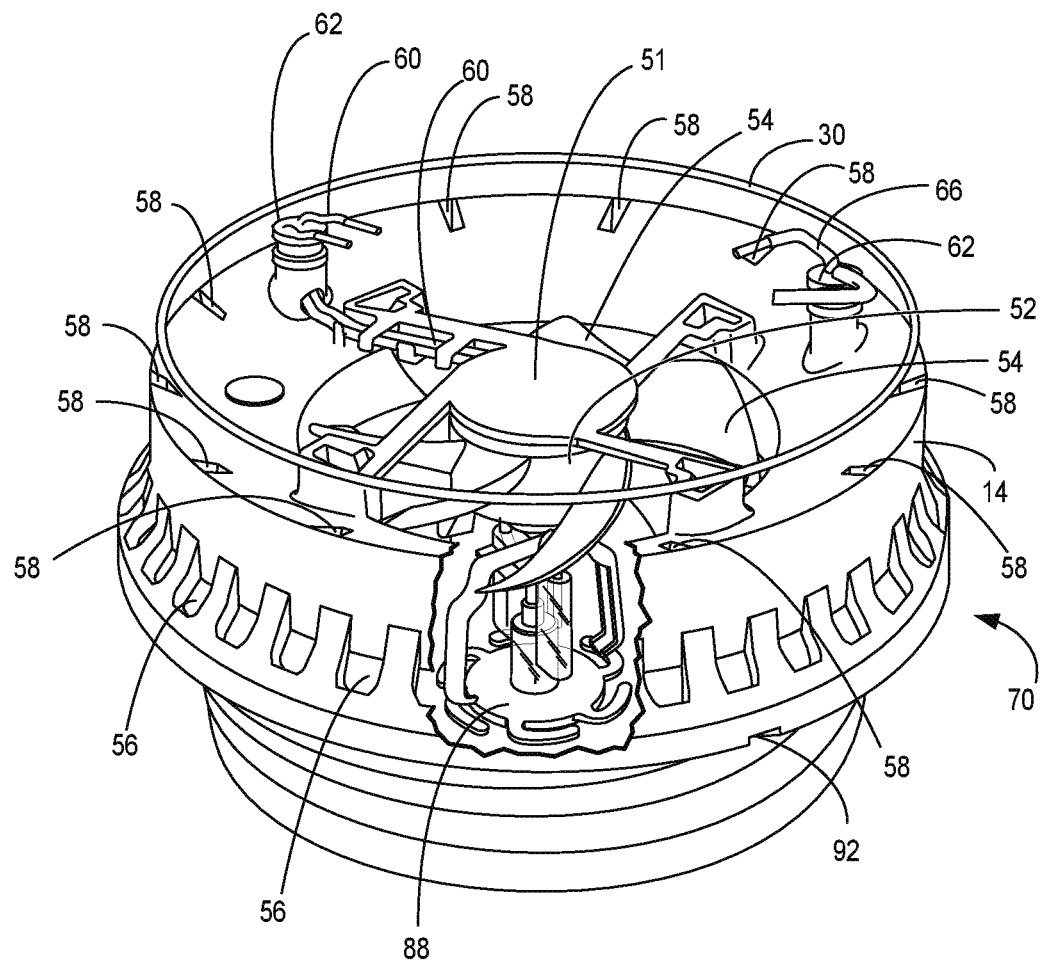
FIG. 4C is a top perspective cutaway view of the coupling component, according to the embodiment of FIGS. 4A-B.
Figure 4D:
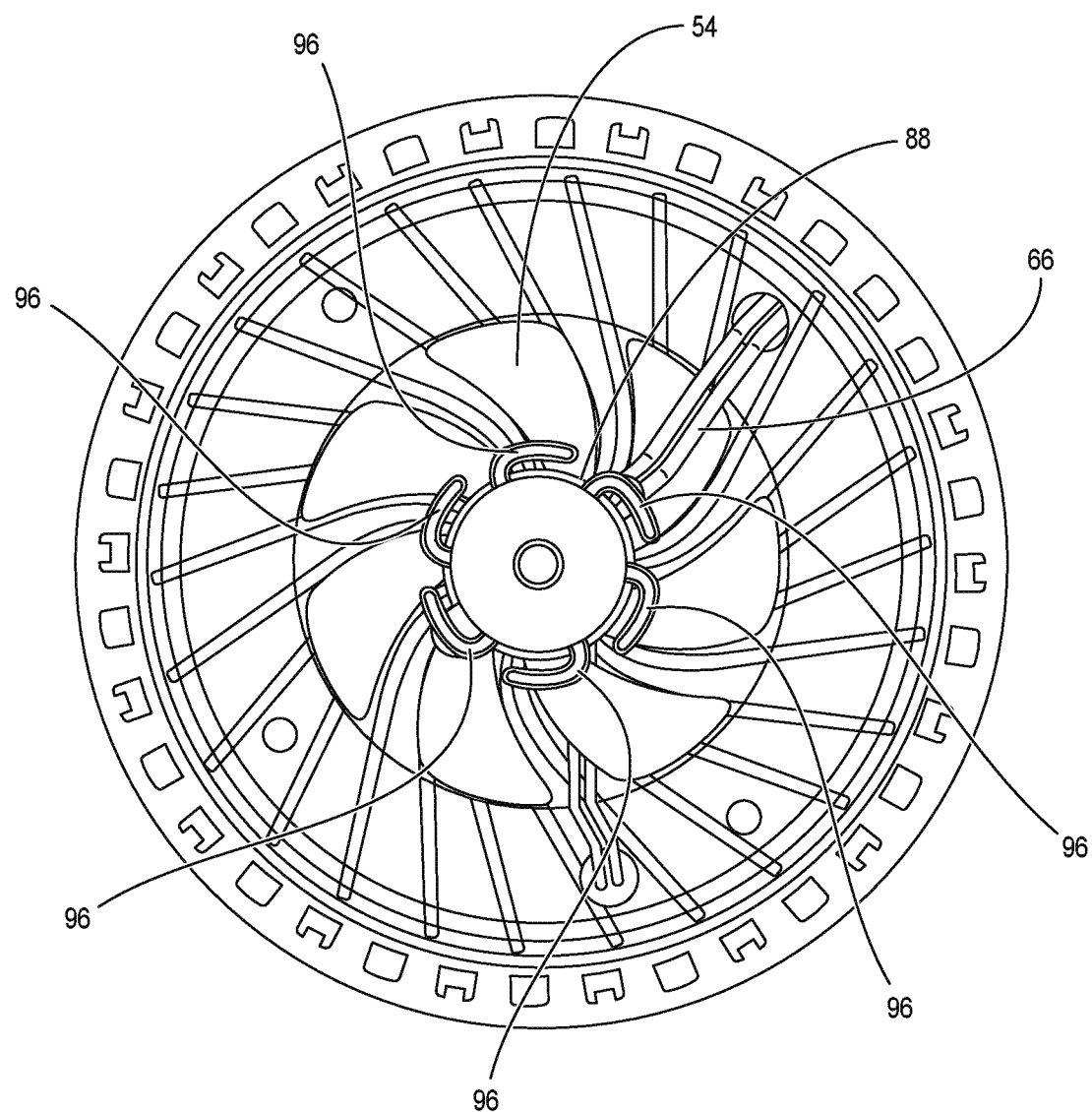
FIG. 4D is a bottom view of the embodiment of FIG. 4C.

FIGS. 4C-4D depict further views of internal components of the coupling component 70. In these implementations, the drains 58 are radially disposed around the coupling component 70. The fan voltage wires 60 are disposed above the fan blades 54 and line voltage wires 66 are shown below the fan blades 54 in this implementation. The disc-shaped socket member 88 has a plurality of elongate radial projections 96 configured to rotate into the threads 76 of the existing socket 80 (as shown in FIG. 2F). The socket adaptor 80 can therefore mechanically and electrically couple with the base threads 76 and socket 82 of the existing jar fixture, or base 16. As would be apparent to a skilled artisan, other socket types are possible.

Figure 5:
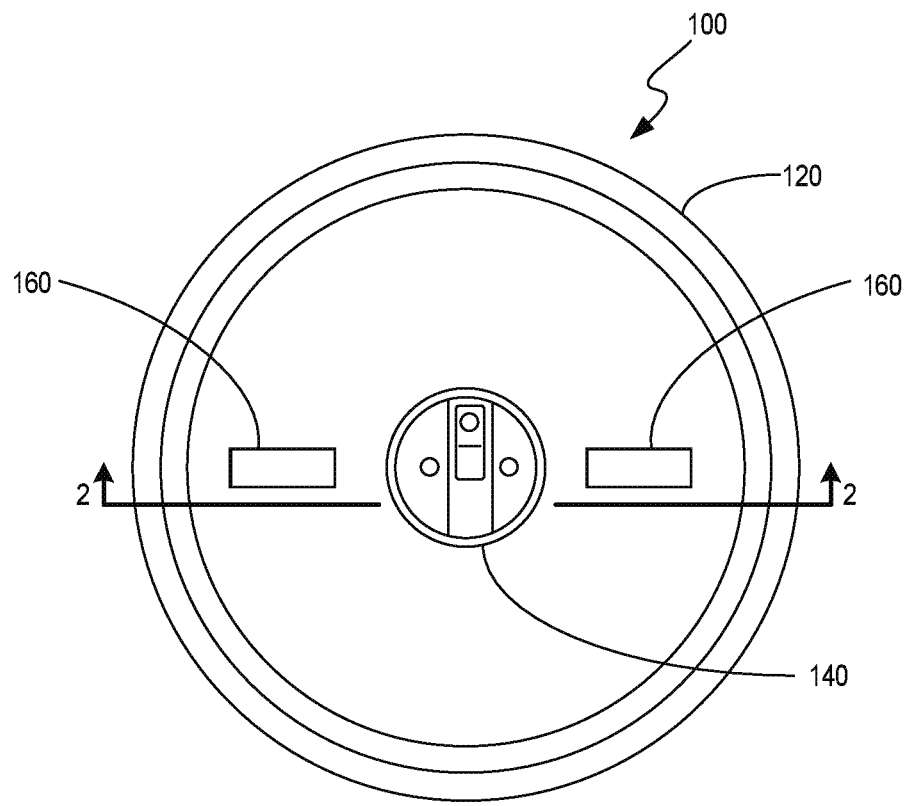
FIG. 5 is a bottom view of a junction box socket sub-assembly, according to an exemplary embodiment.
Figure 6:
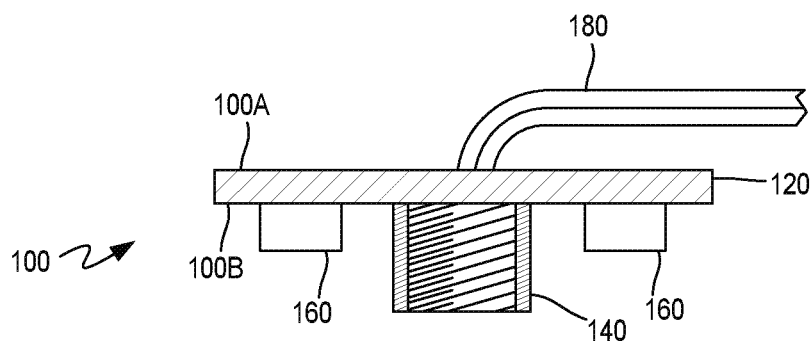
FIG. 6 is a side view of the socket sub-assembly of FIG. 5.

Turning to the installation of the system 1, FIGS. 5-6 depict a junction box socket sub-assembly 100 according to one implementation. As is shown in FIG. 5, the socket sub-assembly 100 comprises a generally circular bracket 120, a centrally-mounted socket 140, and at least one thumb tab 160. In this implementation, the socket 140 is a standard Edison E26 socket, which is replaceable and snap-in. As would be apparent to a skilled artisan, other sockets can be used. In the implementation of FIG. 5, the thumb tabs 160 enable the easy removal of the subassembly 100 from the junction box (shown in FIG. 7 at 200), such that the user may use the tabs to rotate the sub-assembly relative to the junction box, as will be apparent to one of skill in the art according to the description of FIG. 7.

FIG. 6 is a side view of the implementation in FIG. 5, wherein the wiring for the socket 180 extends out the top side 100A of the sub-assembly, while the thumb tabs 160 and socket extend from the bottom side 100B of the sub-assembly. In certain exemplary embodiments, standard 120V wiring is used.

Figure 7:
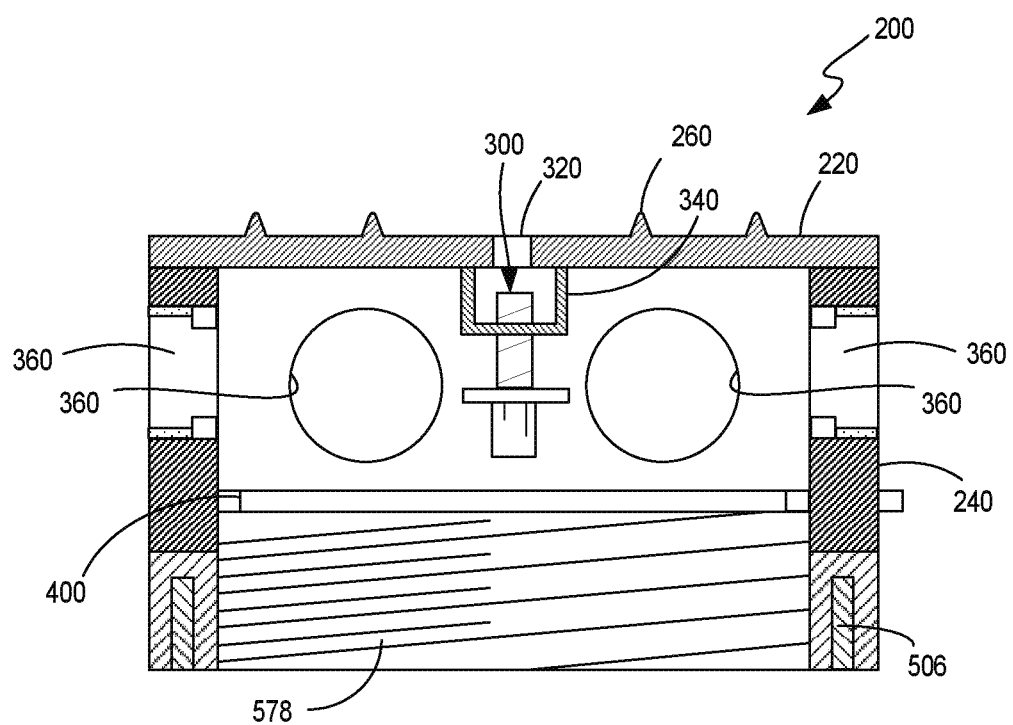
FIG. 7 is a cutaway side view of a junction box according to an exemplary embodiment.

FIG. 7 depicts a cutaway side view of a junction box 200, which is comprised generally of a top portion 220 and at least one side wall 240. In these embodiments, the junction box comprises a number of novel features. Certain embodiments comprise at least one upward protrusion, or "installation-assist bump" 260, which is configured to keep the junction box in a stationary position and prevent "spinning" during installation. Further, in certain embodiments, the top portion and/or side wall are comprised of material, such as certain plastics, which are capable of being directly glued to a PVC surface using standard PVC glue.

Figure 8A:
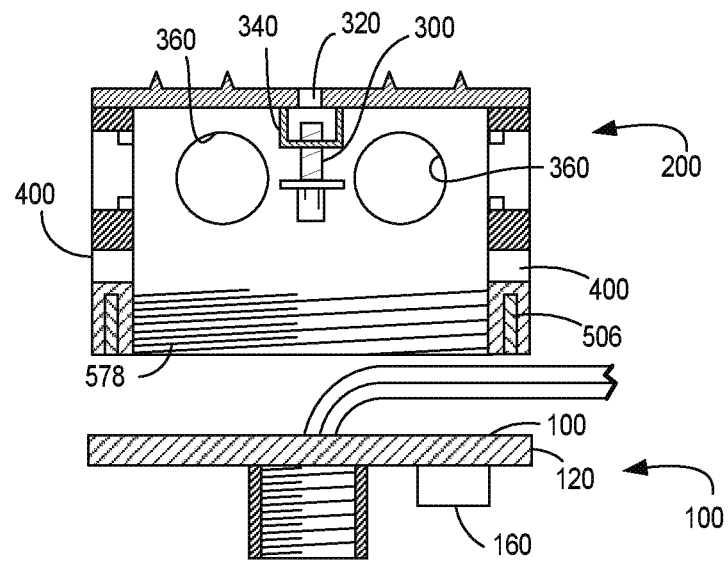
FIG. 8A is a side view of a socket bracket and junction box, according to an exemplary embodiment.
Figure 8B:
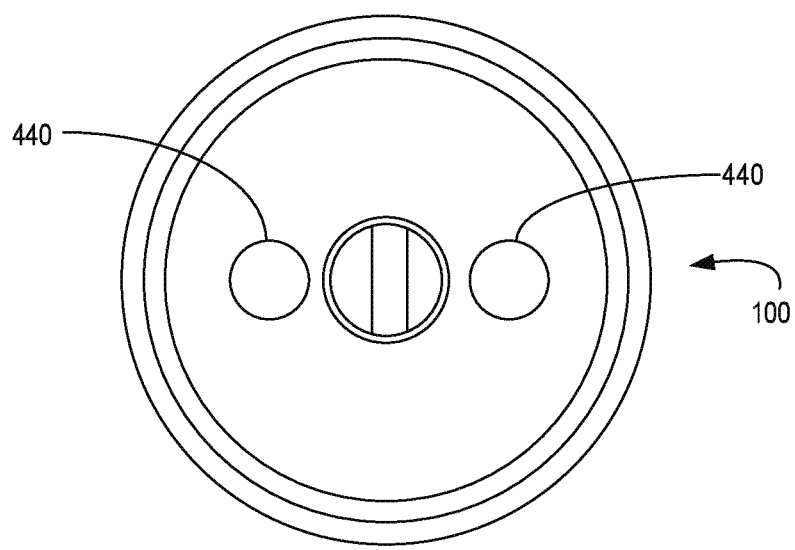
FIG. 8B is a bottom view of the sub assembly comprising finger holes according to an exemplary embodiment.

As is shown in FIGS. 7-8B, in exemplary embodiments the junction box 200 is mounted to the ceiling or other support structure (not shown) by way of a fluidically-sealed "captive" fastener 300 such as a screw, bolt or other fastener known in the art. The fastener 300 is capable of passing through the top portion 220 by way of an opening 320, to allow for the mounting of the junction box 200 to a surface disposed above the top portion (not shown). In certain embodiments, the fastener 300 is passed through a fixedly attached seal 340, which in certain embodiments is comprised of silicone, or silicone-type material to assist in holding the fastener captive and providing a watertight seal.

As best shown in the implementation of FIG. 8A, the side wall 240 has at least one opening 360. In certain embodiments, these can be ¾" or ½" openings, for example, each capable of properly gluing traditional PVC conduit directly to the box without the use of fittings. Skilled artisans would appreciate that other configurations are possible. FIG. 8A also depicts the fastener openings 506 and luminaire threads 578 used for interaction with discussed below in relation to FIGS. 9A and 14A-C, respectively.

As is also shown in FIG. 8A, certain exemplary embodiments of the junction box further comprise a slot 400, which is configured to allow the attachment of the sub-assembly 100 by way of the socket bracket 120, as well as internal threading 420 to allow for water tight jar or "Jelly Jar" LED Light to thread in directly into the junction box, such as those found in provisional application 62/107,810, which is incorporated herein by reference in its entirety).

As shown in FIG. 8B, in alternative embodiments, the sub-assembly 100 can have at least one finger hole 440, which can be used in conjunction with a thumb tab or as an alternative to the thumb tab as a means of allowing the user to easily rotate the sub-assembly for removal and replacement.

Figure 9A:
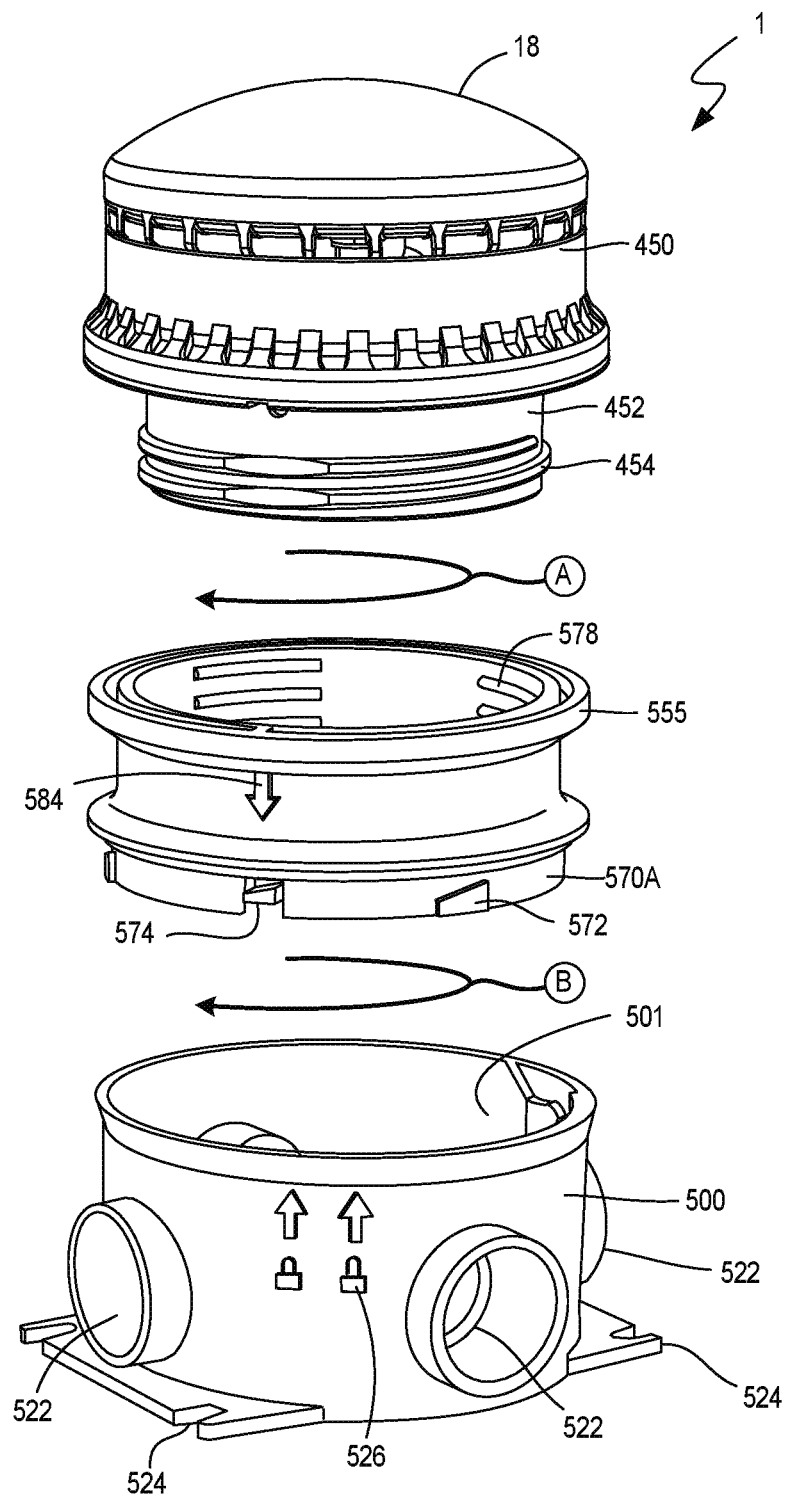
FIG. 9A is an exploded side view of an LED utility fixture comprising an LED lamp, luminaire body and junction box, according to an exemplary embodiment.

FIGS. 9A-16C depict various implementations of the modular light assembly system 1. In the disclosed embodiments generally, a junction box 500 is provided which can be mounted by way of a captive fastener, as previously described. The various components can then be coupled thereon so as to allow the junction box 500 to be operationally integrated with a LED lamp (as shown in FIG. 9A at 450 and in FIGS. 1A-4D at 14), a traditional luminaire body (as shown in FIG. 9B at 502), an existing glass jar (as shown in FIG. 12A at 550), and other components. These modular implementations can further provide for fastener-less coupleablability, in a tool-less, screw-less, and/or twist-and-lock fashion. As such, no tools, screws or fasteners are required for installation, removal or the like, the user may do so manually by twisting and locking the components relative to one another.

Turning to these implementations in greater detail, FIG. 9A depicts an exploded, or separated view of the modular LED system 1 according to one implementation. The generally cylindrical LED system generally has an LED lamp 450 (as discussed in detail in relation to FIGS. 1A-4D as the light component 12), a "twist and lock" luminaire body 555, and a junction box 500. In FIG. 9A, the LED lamp 450 is coupleable to the twist and lock luminaire body 555 by way of a male portion 452 (as is also described in reference to FIGS. 1A-4D in reference to the coupling component 70). In certain implementations, the male portion 452 has threads 454 which are coupleable to the internal luminaire threads 578 such that the LED lamp 450 and twist and lock luminaire body 555 are coupleable in a tool-less fashion (as shown by reference arrow A). In certain implementations, a socket adapter 80 is also provided within the coupling component, though other methods of electrical connectivity can also be utilized, as would be appreciated by skilled artisans.

Continuing with FIG. 9A, the twist and lock luminaire body 555 is coupleable to the junction box 500 by rotation about reference arrow B, such that the circular fitting 570A is coupled to the junction box internal coupling region 501, as is also shown and described in relation to FIG. 10. In exemplary embodiments, the junction box 500 further comprises a generally circular body and at least one opening 522. Further, in these embodiments, the junction box 500 can further comprise outboard mounting feet 524 and alignment marks, or visual cues 526 to facilitate the process of junction box 500 installation. Further description can be found in relation to FIGS. 11A-D.

Figure 9B:
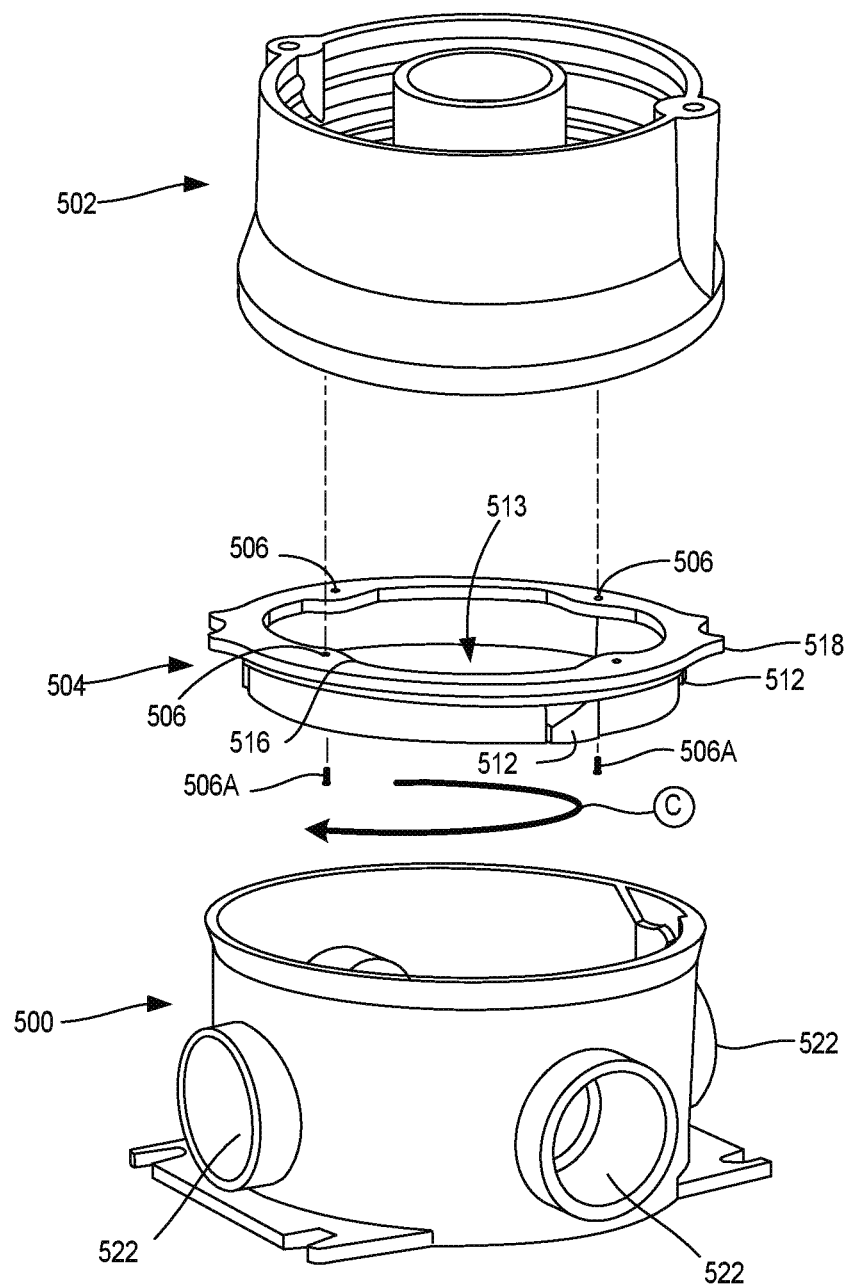
FIG. 9B is an exploded side view of a junction box, traditional device junction box adaptor and traditional luminaire body according to an exemplary embodiment of the modular LED system.
Figure 10A:
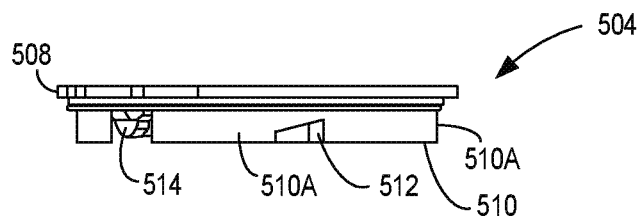
FIG. 10A is a side view of a traditional device adaptor, according to an exemplary embodiment of the modular LED system.
Figure 10B:
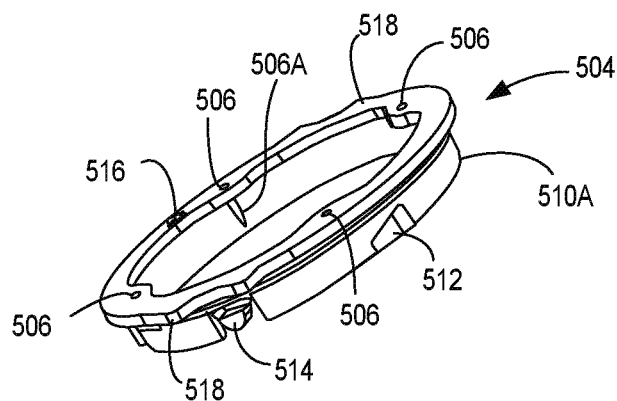
FIG. 10B is a perspective view of the embodiment of FIG. 10A.
Figure 10C:
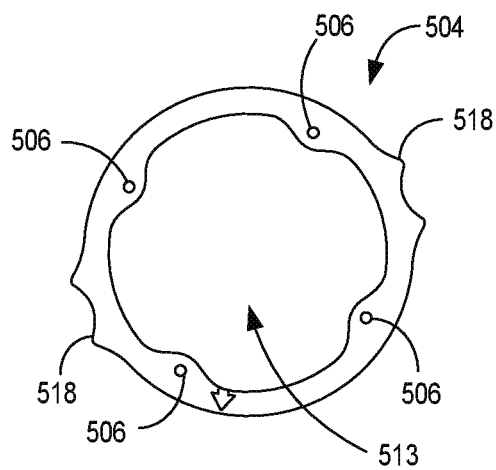
FIG. 10C is a top view of the embodiment of FIG. 10A.
Figure 10D:
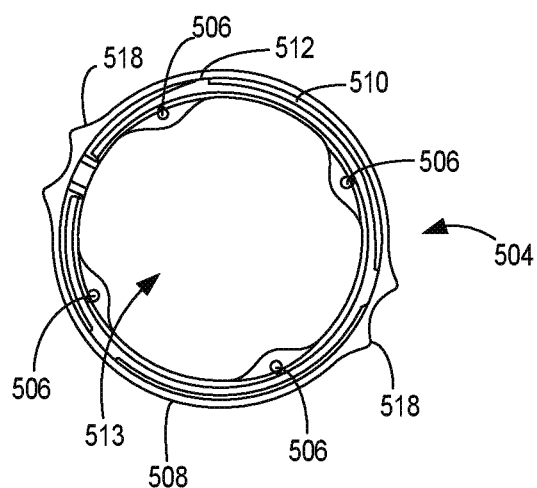
FIG. 10D is a bottom view of the embodiment of FIG. 10A.

FIG. 9B depicts a separated view of a junction box 500 adapted to couple to a traditional luminaire body 502, according to one implementation (as is also shown in FIGS. 1A-1F at 16). In FIG. 9B, the junction box 500 attaches to the traditional luminaire body 502 by way of a traditional junction box adapter 504 with at least two fasteners 506A disposed through fastener openings 506, as is also shown in FIG. 10B. The fastener openings 506 are disposed about traditional junction box adapter 504 to facilitate the connection of the traditional luminaire body 502 and traditional junction box adapter 504. In these embodiments, the junction box 500 and traditional luminaire body 502 can then be coupled to one another by a rotating twist-lock coupling, as is shown by reference arrow C. In these embodiments, the traditional junction box adapter 504 further comprises a central opening 513 which allows for the passage of wiring (not shown) to power the LED lamp between the traditional luminaire body 502 and junction box 500.

FIG. 9C depicts an exploded top view of a junction box 500 with an O-ring 700 disposed within the junction box wall 701. In various implementations, the O-ring 700 is secured between the inner wall 702 of the junction box 500 and the outer wall 704 of the junction box 500. In certain implementations, the O-ring 700 is pressed down and secured or otherwise disposed between the inner wall of the junction box 702 and the outer wall of the junction box 704 so as to be capable of creating a seal at the junction with an attached component, as is shown in FIGS. 9D-9E, as would be understood by one of skill in the art.

In certain implementations, once pressed down, snap-fitted or otherwise fitted within the junction box wall 700, the O-ring 700 is secure enough not to come out of the junction box 500 without applying and external force. In implementations using the O-ring 700, screws and connectors are eliminated and a watertight seal is created when attachments are installed. The use of an O-ring 700 eliminates the need for other fasteners, for example screws. Additionally, the embedded O-ring 700 also eliminates the need for the installer to fasten any type of gasket or other watertight seal onto the junction box or attaching device during installation. As a result, the installation can be conducted more rapidly. The O-ring embodiment of FIGS. 9C-9E does not require screws or any other type of connector to provide a watertight seal.

Continuing on to FIGS. 9D and 9E, in further implementations, the O-ring 700 creates a watertight seal when a junction box cover 610 is installed (FIG. 9D) or when a luminaire 555 is attached to the junction box (FIG. 9E). or any other type of device or attachment to the junction box 500.

In further implementations, the O-ring 700 can also be designed to be embedded in the various coupling portions and covers disclosed elsewhere herein to provide a watertight seal when the component—such as the adapter, cover or luminaire coupling portion 555 is attached to the junction box 500 or other component. These implementations eliminate the need for screws or other fasteners to provide a watertight seal.

FIGS. 10A-D depict further views of the traditional junction box adapter 504, according to certain implementations. The traditional junction box adapter 504 is substantially circular, with an opening disposed within it, and further comprises a luminaire coupling portion 508 and a junction box coupling portion 510. In exemplary embodiments, the luminaire coupling portion 508 is configured to substantially contact a traditional luminaire body 502, while the junction box coupling portion 510 is comprised of a circular fitting 510A adapted to twist-couple with the junction box 500. At least one locking cam 512 is disposed about the circular fitting 510A, as is at least one rollover cam lock configured to lock with the locking cam socket (shown at 530 in FIGS. 11A-D).

As is further shown in FIGS. 10A-D, the traditional junction box adapter 504 further comprises a plurality of fastener openings 506 disposed about the luminaire coupling portion 508. At least one alignment mark 516 is further provided on the surface of the luminaire coupling portion 508 to provide the user with a visual cue. Further, in certain implementations, at least one grasping portion 518 is disposed on the luminaire coupling portion 508 to facilitate twisting the portion relative to the junction box for purposes of coupling, uncoupling, locking and unlocking.

Several views of the junction box 500 subassembly are depicted in FIGS. 11A-D. In this implementation, the junction box 500 has a generally circular junction housing 520 with an internal coupling region 501 within the internal lumen 500A and plurality of openings 522 disposed about it. These openings 522 can serve as glue-in conduit hubs, as has been previously described. Certain embodiments of the junction box 500 further comprise a plurality of outboard mounting feet 524 and alignment marks or visual cues 526 for use with corresponding alignment marks on various coupleable aspects (such as the traditional junction box adapter of FIGS. 10A-D). Further, in this implementation a watershed feature 528 can function to keeps debris like dust, dirt, feathers, etc, from accumulating on the fixture or assembly.

Continuing with FIGS. 11A-D, the junction box 500 also has a locking cam socket 530, at least one rollover cam socket 532, and a release socket 534. The locking cam socket 530, at least one rollover cam socket 532, and a release socket 534 are adapted to be selectively coupleable and lockable with various "twist-on" components, such as the traditional junction box adapter described in relation to FIGS. 10A-D, and as would be understood by one of skill in the art.

As is also best shown in FIGS. 11A-D, the top portion 540 has at least one mounting hole 536 and captive fastener 538 set inside the top portion 540 such that the "captive," or water-tight fastener 542 is capable of passing through the top portion 540, so as to allow for the mounting of the junction box 500 to a surface such as a ceiling (not shown) disposed above the top portion 540. Further discussion of the "captive" fastener, such as a screw, is found above in relation to FIGS. 5-8.

Figure 12A:
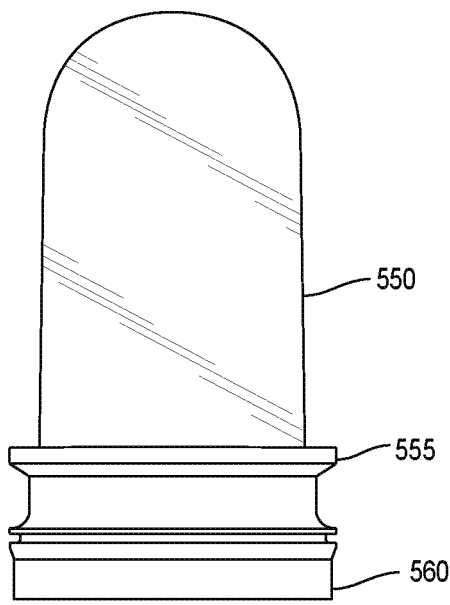
FIG. 12A is a side view of a utility jar fixture comprising a glass jar, luminaire body and female adaptor, according to an alternate embodiment of the modular LED system.
Figure 12B:
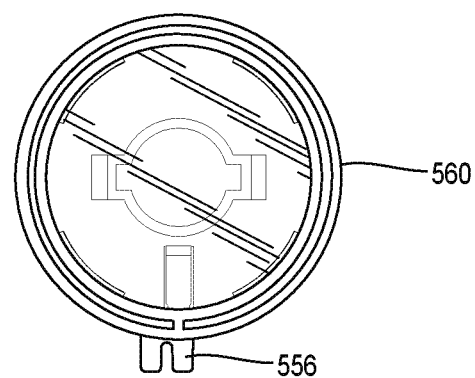
FIG. 12B is a top view of the embodiment of FIG. 12A.
Figure 13:
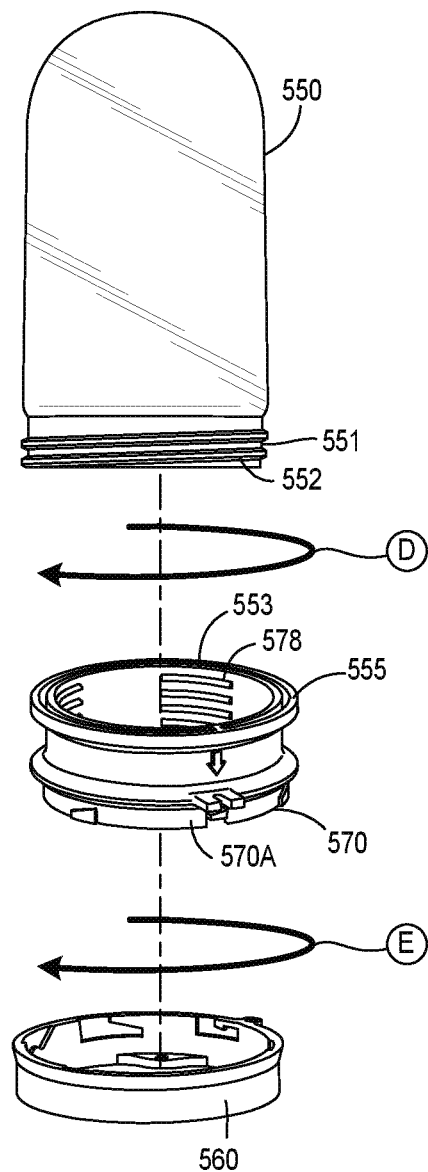
FIG. 13 is an exploded side view of the embodiment of FIGS. 12A-12B.

As best shown in the implementations of FIGS. 12A-13, a glass jar 550 can be coupled to a twist and lock luminaire body 555 by way of a female adapter 560. As is shown in FIG. 13, in these embodiments, the glass jar 550 can be coupled to a twist and lock luminaire body 555 by a twist-to-lock procedure depicted as reference arrow D, and the female adapter 560 and twist and lock luminaire body 555 can be coupled in a similar fashion by movement along reference arrow E. Accordingly, the glass jar 550 features a jar male coupling 552 configured to be integrated with a female portion 553 of the twist and lock luminaire body 555. In alternative embodiments, other coupling arrangements can be utilized, as would be apparent to one of skill in the art. An external mechanical latch 556 can also be provided.

As is best shown in the implementations of FIGS. 14A-C the opposite side of the twist and lock luminaire body 555 has a coupling portion 570 with a circular fitting 570A adapted to twist-couple with the female adaptor 560. In these implementations, at least one locking cam 572 is disposed about the circular fitting 570A, as is at least one release lock 574, which is configured to be able to lock with the release socket (depicted in FIGS. 15A-C). Watershed features 576 are further disposed about the twist and lock luminaire body 555, as are various alignment marks 579. Luminaire threads 578 can be disposed within the opening of the twist and lock luminaire body 555 to be coupleable to the LED light 450 or glass jar 550 (discussed above). Finally, in certain exemplary embodiments, a lamp holder opening 580 is provided within the central luminaire platform 582 so as to allow the passage of a socket through the opening. Alignment marks 584 can also be disposed on the exterior of the twist and lock luminaire body 555.

Figure 15A:
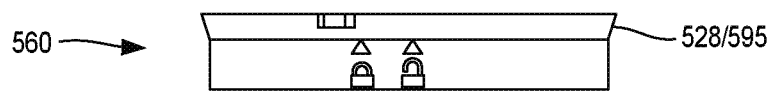
FIG. 15A is a side view of a female adaptor to a traditional junction box, according to an exemplary embodiment of the modular LED system.
Figure 15B:
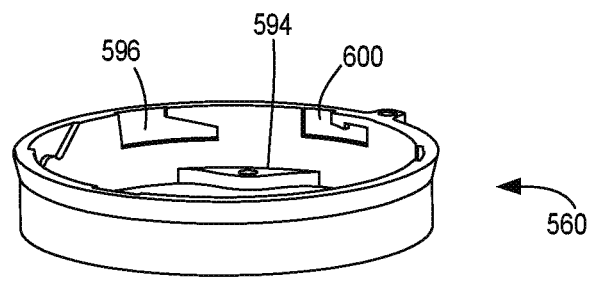
FIG. 15B is a top perspective view of the embodiment of FIG. 15A.
Figure 15C:
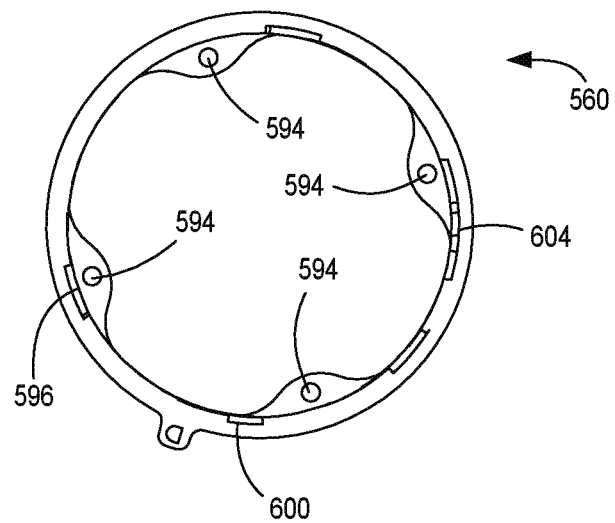
FIG. 15C is a bottom view of the embodiment of FIG. 15A.

FIGS. 15A-C depict the generally circular female adapter 560, which further comprises a central opening 590. At least one alignment mark and watershed feature 595 may be disposed on the outer surface of the female adapter 560. In exemplary embodiments, at least one mounting opening 594 is disposed within the female adapter 560, as well as at least one locking cam socket 596 and release lock socket 600, which are capable of operational communication with the locking cam and release lock depicted in FIGS. 14A-C. A rollover cam socket 604 can also be provided. The interaction of these components would be apparent to one of skill in the art.

Figure 16A:
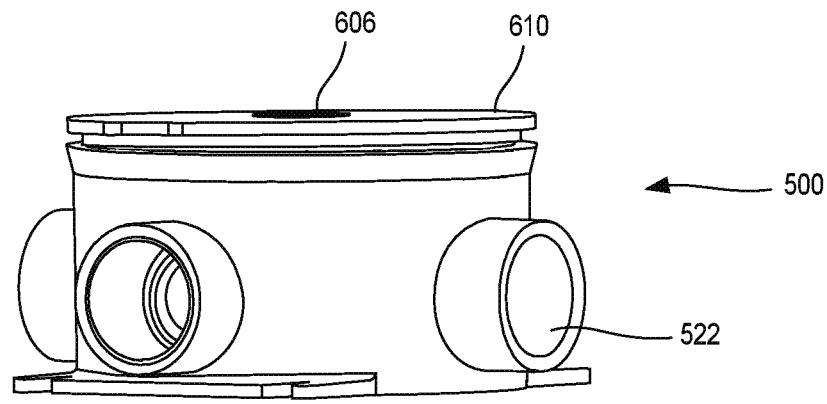
FIG. 16A is a side view of a watertight junction box, according to an exemplary embodiment of the modular LED system.
Figure 16B:
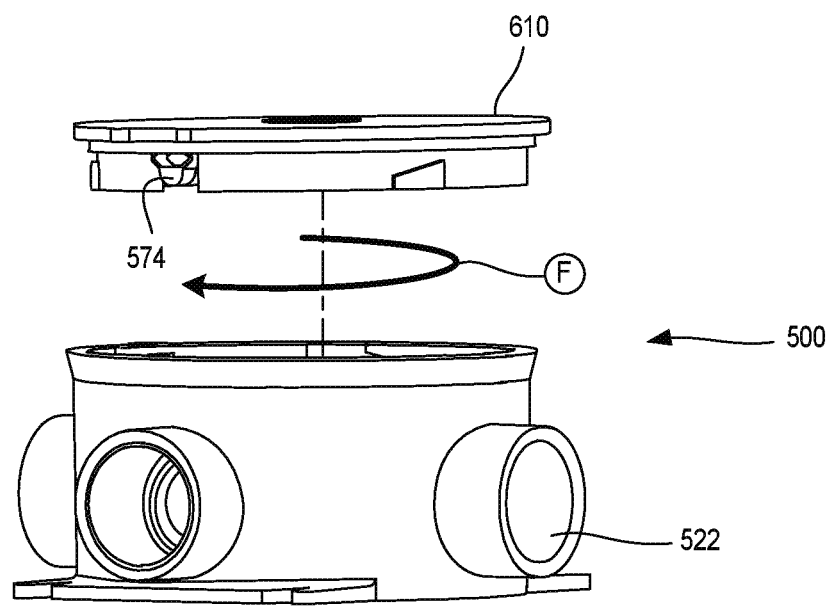
FIG. 16B is an exploded view of the embodiment of FIG. 16A.
Figure 16C:
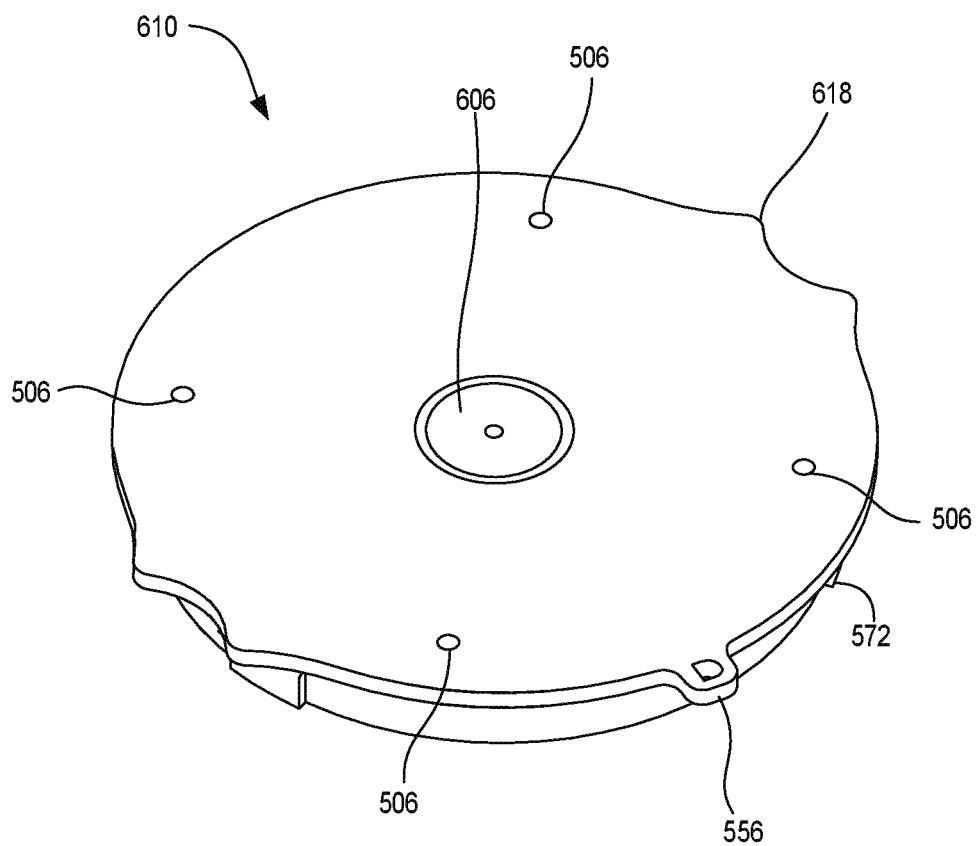
FIG. 16C is a perspective top view of the blank cap of FIG. 16A.

Further implementations of the junction box 500 in a watertight implementation are depicted in FIGS. 16A-C. In these implementations, a fastener-less and tool-less twist and lock cover 610 is provided. The lock cover 610 is coupleable with the junction box 500 and capable of forming a watertight seal. In the implementation of FIG. 16C, a plurality of fastener openings 506 and an drilling target 606 are provided. The drilling target 606 can embossed and used to for drilling out an opening for connecting a related device or wiring connector, as would be appreciated by one of skill in the art. In various implementations, at least one grasping portion 618 is disposed on the twist cover 610 so as to facilitate twisting the portion relative to the junction box for purposes of coupling, uncoupling, locking and unlocking, as is performed by way of the junction coupling region 612 around reference arrow F, as has been previously described, for example, in relation the traditional luminaire body 502.

Although the disclosure has been described with reference to preferred embodiments, persons skilled in the art will recognize that changes may be made in form and detail without departing from the spirit and scope of the disclosed apparatus, systems and methods.

The invention claimed is:

1. A junction box, comprising:
   (a) a housing comprising:
      (i) a top portion;
      (ii) a substantially circular wall extending from the top portion, comprising:
         (1) an internal coupling region; and
         (2) a captured o-ring embedded in the substantially circular wall, the o-ring configured to create a watertight seal between the substantially circular wall and an attachment;
   (b) the attachment comprising a second substantially circular wall comprising an external coupling region; and
   (c) a captive fastener configured to pass through the top portion for mounting of the junction box to a surface, wherein the external coupling region and the internal coupling region are shaped and arranged to be releasably couplable via a twist-and-lock configuration.

2. The junction box of claim 1, wherein the captive fastener passes through a seal, wherein the seal is fixedly attached to the top portion.

3. The junction box of claim 1, wherein the internal coupling region comprises a locking socket and wherein the housing comprises an external locking socket disposed on an exterior portion of the housing.

4. The junction box of claim 3, wherein the external coupling region comprises a locking projection shaped to fit within the locking socket, and wherein the attachment comprises an external locking projection disposed on an exterior portion of the attachment, the external locking projection shaped to be engaged with the external locking socket.

5. The junction box of claim 1, wherein the watertight seal is created without the use of tools or other fasteners.

6. The junction box of claim 1, wherein the junction box is installed in a wet location.

7. The junction box of claim 1, further comprising one or more conduit hubs located on the substantially circular wall.

8. The junction box of claim 7, wherein the conduit hubs are glue-in conduit hubs.

9. An electrical system, comprising
(a) a junction box comprising:
  (i) a planar portion comprising an opening;
  (ii) a substantially circular wall extending from the planar portion, the substantially circular wall comprising a first coupling portion comprising at least one locking socket;
  (iii) an o-ring embedded in the substantially circular wall, the o-ring configured to provide a watertight seal when an attachment is locked on the junction box;
  (iv) a seal adjacent to the opening; and
  (v) a captive mounting screw disposed through the opening and the seal;
(b) an attachment comprising a second coupling portion comprising least one locking projection,
wherein the junction box and the attachment are configured to be rotatably coupled such that the locking projection is shaped to lock with the locking socket when the attachment is rotated onto the junction box, and
wherein the captive mounting screw is configured to mount the junction box to a surface.

10. The system of claim 9, wherein the attachment is selected from a cover, a jelly jar, an LED light, or an adaptor.

11. The system of claim 10, wherein the attachment is a cover and wherein the cover comprises one or more openings.

12. The system of claim 9, further comprising an external locking socket disposed on an external portion of the substantially circular wall and an external locking projection disposed on an external portion of the attachment, wherein the external locking socket and external locking projection are shaped to be couplable when the junction box and the attachment are rotatably coupled.

13. The system of claim 9, wherein the junction box and attachment can be coupled without the use of screws or tools.

14. The electrical system of claim 9, further comprising one or more conduit hubs located on the substantially circular wall.

15. The junction box of claim 14, wherein the conduit hubs are glue-in conduit hubs.

16. A junction box comprising:
(a) a substantially circular housing fixedly attached to a top portion;
(b) an internal coupling region within the substantially circular housing;
(c) an o-ring embedded within the substantially circular housing substantially opposite the top portion;
(d) a locking cam socket within the internal coupling region;
(e) an external locking socket;
(f) an opening within the top portion;
(g) a seal fixedly attached to the junction box adjacent to the opening; and
(h) a screw disposed through the opening and the seal, wherein the screw is configured to mount the junction box to a surface.

17. The junction box of claim 16, further comprising an adaptor comprising:
(a) a coupling portion; and
(b) a locking cam within the coupling portion,
wherein the adaptor is rotatably coupleable with the internal coupling region of the junction box via the coupling portion such that the locking cam is coupleable with the locking cam socket.

18. The junction box of claim 17, wherein the adaptor further comprises an external locking projection shaped and arranged to releasably connect with the external locking socket.

19. The junction box of claim 18, wherein the junction box and adaptor can be coupled without the use of screws or tools.

20. The junction box of claim 17, further comprising one or more conduit hubs located on the substantially circular housing.

* * * * *